(12) United States Patent
Doolaege

(10) Patent No.: US 6,783,300 B2
(45) Date of Patent: Aug. 31, 2004

(54) WATER CONTAINMENT STRUCTURE

(76) Inventor: David Doolaege, P.O. Box 206, Carlotta, CA (US) 95528

( * ) Notice: Subject to any disclaimer, the term of this patent is extended or adjusted under 35 U.S.C. 154(b) by 0 days.

(21) Appl. No.: 10/349,249

(22) Filed: Jan. 23, 2003

(65) Prior Publication Data

US 2004/0146359 A1 Jul. 29, 2004

(51) Int. Cl.$^7$ ................................................. E02B 7/02
(52) U.S. Cl. ............................ 405/115; 405/91; 405/22
(58) Field of Search ........................... 405/22, 32, 91, 405/107, 108, 115

(56) References Cited

U.S. PATENT DOCUMENTS

| | | | |
|---|---|---|---|
| 3,373,568 A | 3/1968 | Hornbostel | |
| 3,861,158 A | 1/1975 | Swain | |
| 4,352,591 A | * 10/1982 | Thompson | 405/87 |
| 4,729,691 A | 3/1988 | Sample | |
| 4,780,024 A | * 10/1988 | Obermeyer et al. | 405/115 |
| 4,799,821 A | 1/1989 | Brodersen | |
| 4,966,491 A | 10/1990 | Sample | |
| 4,981,392 A | 1/1991 | Taylor | |
| 5,040,919 A | 8/1991 | Hendrix | |
| 5,059,065 A | 10/1991 | Doolaege | |
| 5,125,767 A | 6/1992 | Dooleage | |
| 5,605,416 A | * 2/1997 | Roach | 405/21 |
| 5,743,674 A | * 4/1998 | Healy | 405/52 |
| 5,785,455 A | 7/1998 | Eaker | |
| 5,857,806 A | * 1/1999 | Melin | 405/115 |
| 5,865,564 A | 2/1999 | Miller | |
| 5,984,577 A | 11/1999 | Strong | |
| 6,126,362 A | 10/2000 | Carter | |
| 6,334,736 B1 | * 1/2002 | Johnson et al. | 405/114 |
| 6,364,571 B1 | 4/2002 | Doolaege | |

FOREIGN PATENT DOCUMENTS

| | | | | |
|---|---|---|---|---|
| DE | 3810493 A1 | * | 3/1989 | E02B/7/20 |
| JP | 570684408 A | * | 4/1982 | E02B/7/20 |

* cited by examiner

Primary Examiner—Heather Shackelford
Assistant Examiner—Lisa M Saldano
(74) Attorney, Agent, or Firm—M. Reid Russell

(57) ABSTRACT

A water structure formed from at least a pair of sleeves from a puncture resistant flexible material joined along common longitudinal surfaces, as by sewing, and include sleeve ends that are formed into closed to maintain closed-off ends of water filled tubes, and including an arrangement, such as an outer sleeve, for maintaining the pair of sleeves in side by side relationship and/or may includes at least one ground sheet for anchoring the water structure.

10 Claims, 17 Drawing Sheets

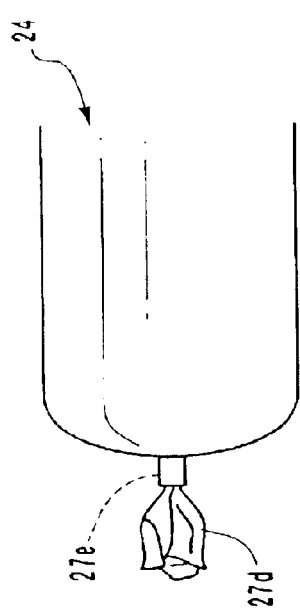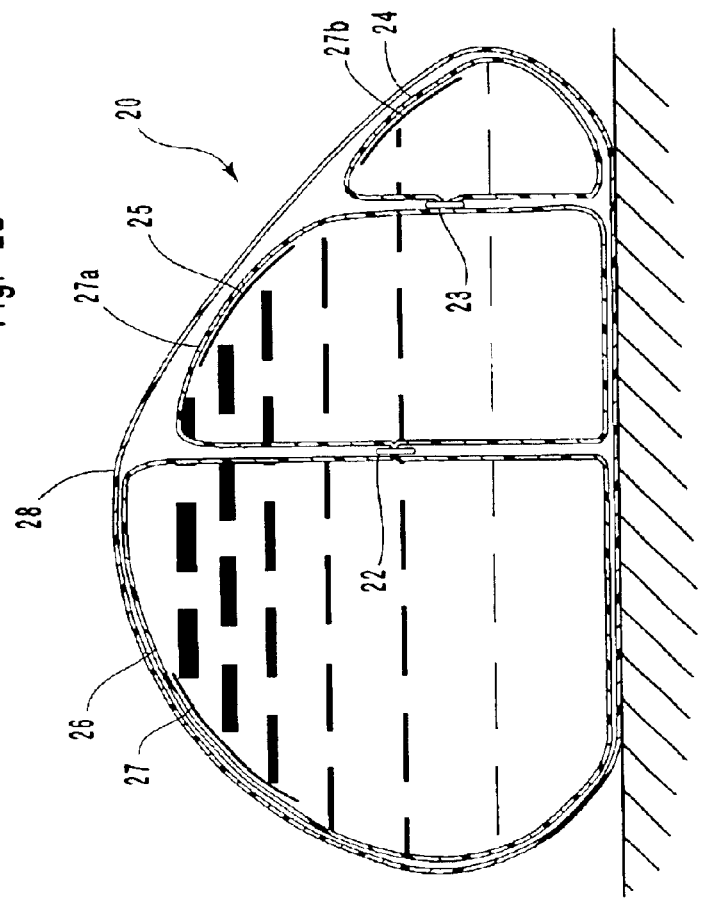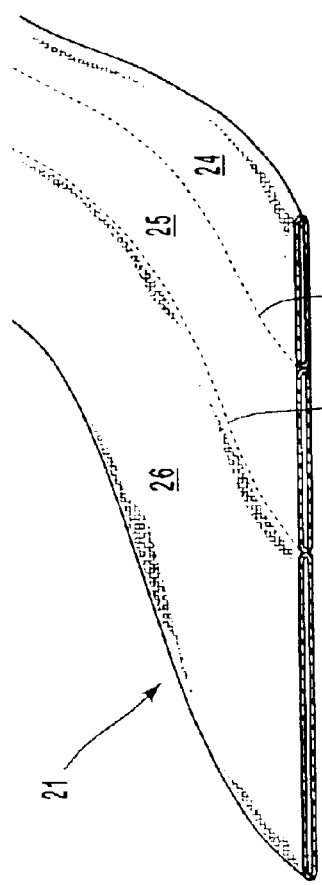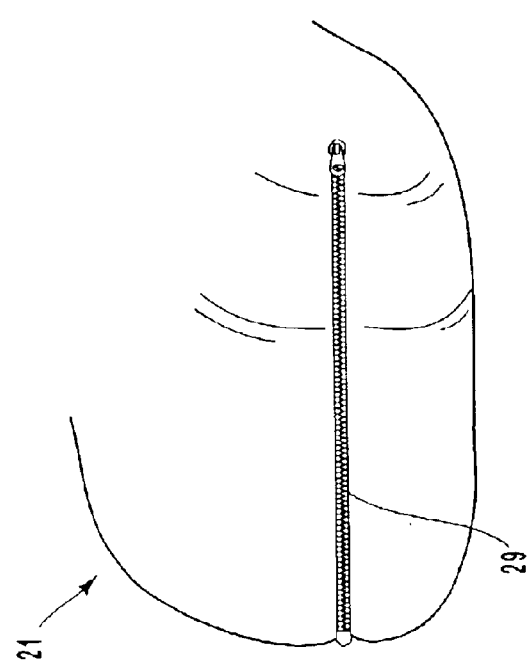

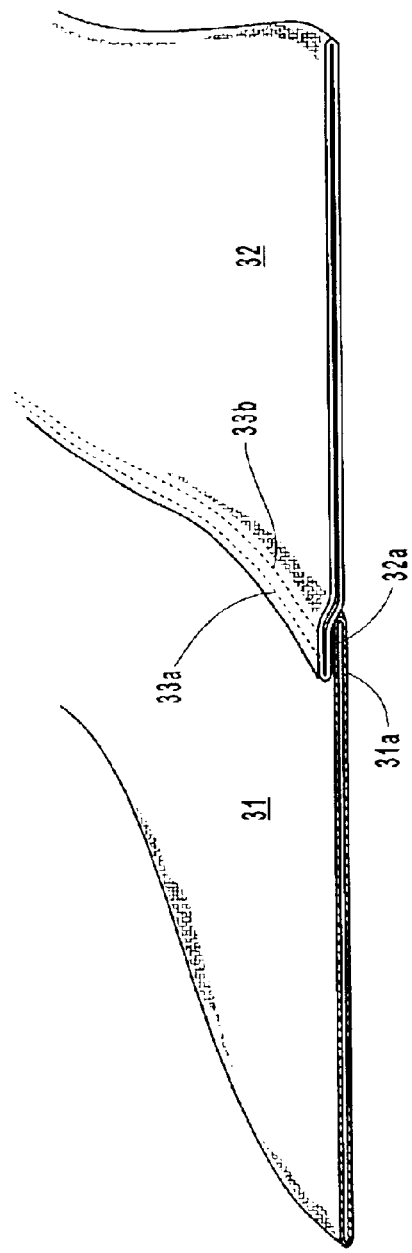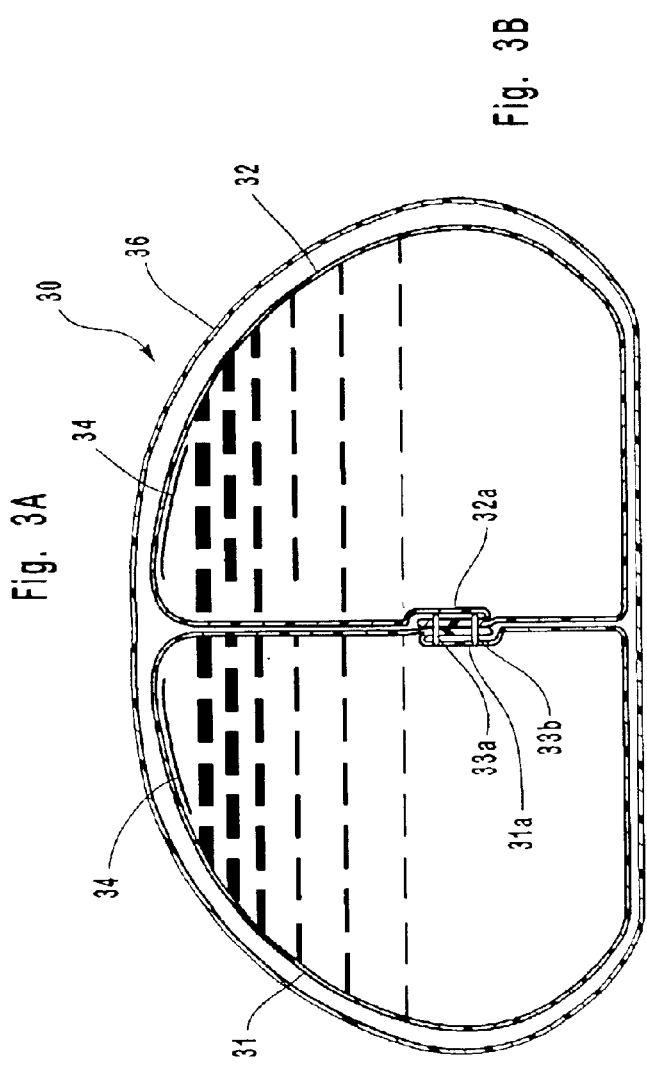

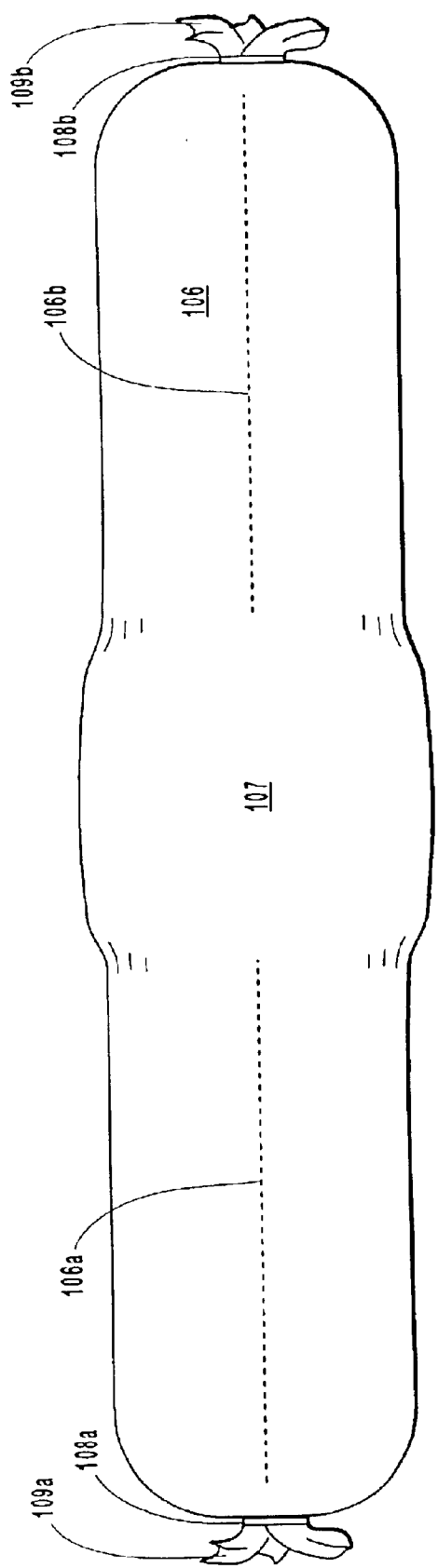
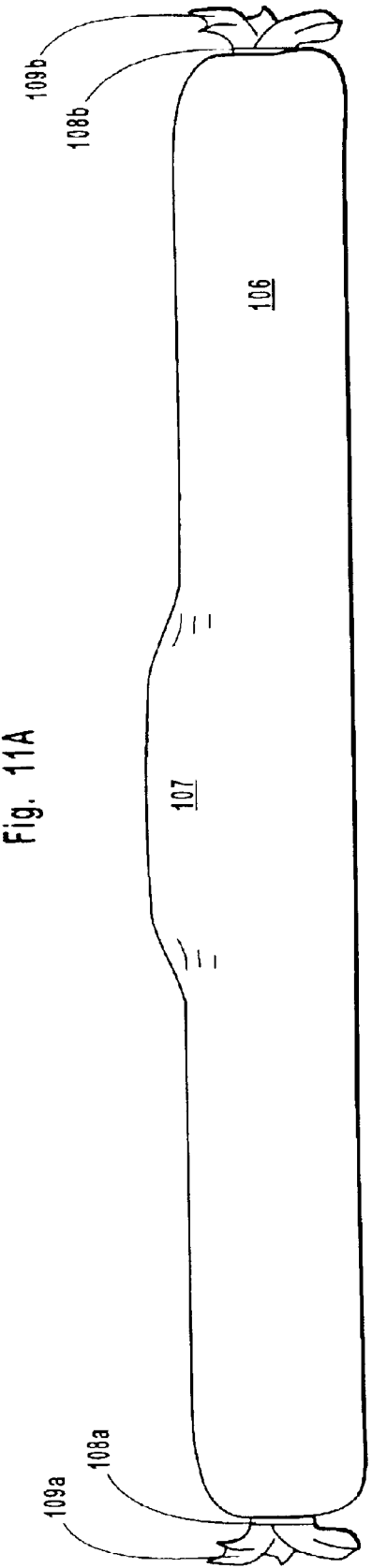
Fig. 11A
Fig. 11B

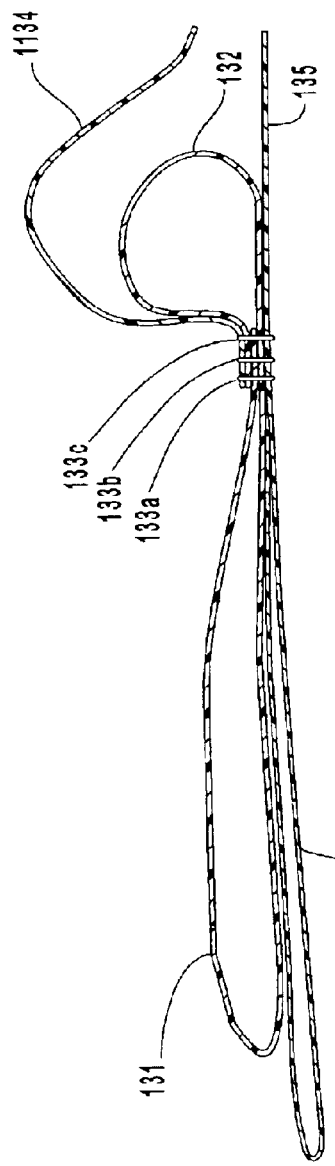
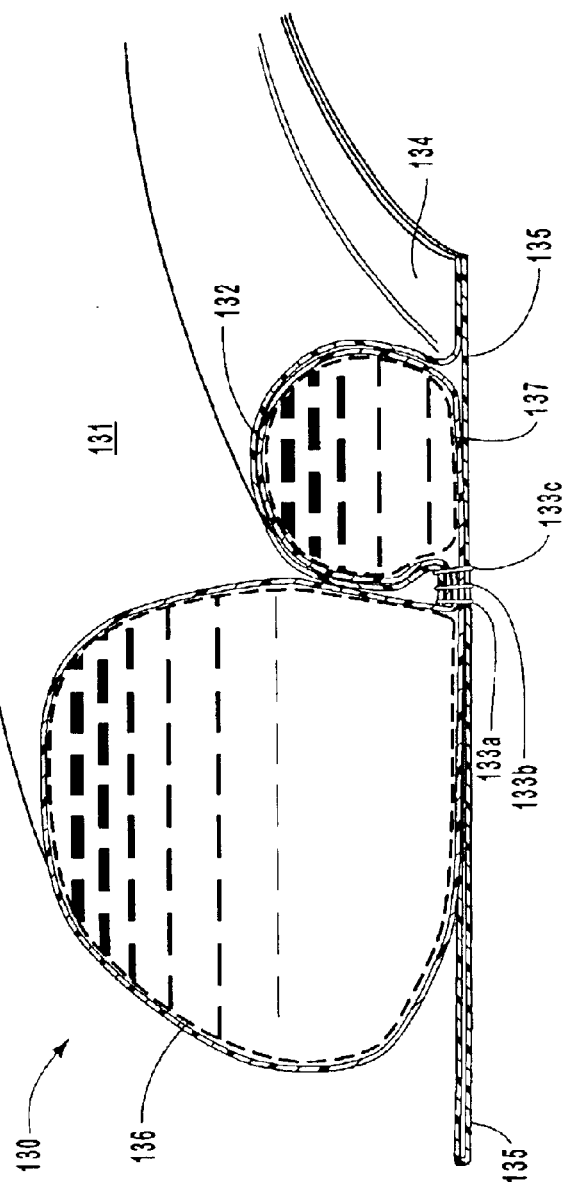
Fig. 14A
Fig. 14B

WATER CONTAINMENT STRUCTURE

BACKGROUND OF THE INVENTION

1. Field of the Invention

This invention relates to structures for damming water courses, controlling and directing water flow, working and support structures where outer fabric sleeves are formed and connected together into stacks, side by side relationship, in cascade arrangement, and the like, forming a dam, water course, fish ladder, or other structure, that are inexpensive to construct, erect, and dismantle, forming a variety of structures.

2. Prior Art

A need for easily installable and versatile dam structures, and the like, particularly structures that are primarily water or air filled, that are relatively inexpensive, non-permanent, reusable and are durable has been early recognized by the inventor who has been awarded U.S. Pat. Nos. 5,059,065 and 5,125,767 for forming and joining water structures together, forming hydraulic damming structures, and in a recent U.S. Pat. No. 6,364,571, that shows a combination of water transfer and damning structures and platforms. Such water structures have been found to be very useful for safely and reliably containing water and for directing water, and are also useful for controlling hazardous waste, oil or chemical spills, for flood control, and the like. Further, such water structures are also useful, for example, for temporary damming operations such as may be involved in agricultural water storage, construction, for de-watering work sites, fields, or the like, and are even appropriate for use as permanent or long term structures.

Heretofore it has been recognized that fluid filled flexible water control structures and barriers can be used for retention and storage of water, control of water flow and wave action, and a number of configurations of dams and barriers that have been formed as both semi-permanent and temporary structures. Additional to the U.S. patents of the inventor, other such arrangements are shown, for example, in U.S. Patents to: Hornbostel, Jr., U.S. Pat. No. 3,373,568; Sample, U.S. Pat. No. 4,729,691; Brodersen, U.S. Pat. No. 4,799,821; Hendrix, U.S. Pat. No. 5,040,919; Roach, U.S. Pat. No. 5,605,416; Melin, U.S. Pat. No. 5,857,806; and Miller, et al., U.S. Pat. No. 5,865,564. Which above cited U.S. Patents show various containment, dam and barrier configurations from permanent to portable structures, and include, as shown in the patent to Brodersen, a structure for encircling a chemical or oil spill. Such earlier patents, however, do not show the various combination of flexible sleeves that are individually joined, as by sewing, into appropriate shapes with each inner sleeve to receive a tube or tubes that are filled with water, forming a containment structure for a particular area or need.

While the particular connected sleeves that receive water filled tubes of the invention are unique, heretofore other specialty water filled structures have been employed as shown, for example, in Thompson, U.S. Pat. No. 4,352,591; Sample, U.S. Pat. No. 4,966,491; Taylor, U.S. Pat. No. 4,981,392; Eaker, U.S. Pat. No. 5,785,455, and Strong, U.S. Pat. No. 5,984,577. Where the above cited patents generally involve inflatable envelope arrangements none provide the combination of joined sleeves to contain the same or different diameters of water filled tubes and cooperating structures for producing the strong and reliable specialty water structures of the invention, that can be further accessorized as by an inclusion of anchoring structures and other water conveying arrangements, such as separate culverts or pipes and attachment methods. Further examples of earlier accessorized structures shown in patents to Swain, et al., U.S. Pat. No. 3,861,158 and to Carter, et al., U.S. Pat. No. 6,126,362, that, however, lack the features of the connected outer sleeves of the invention.

Summarizing, unlike the invention, none of the above set out prior art structure provide a barrier arrangement or arrangements of barriers were outer sleeves are fitted and maintained together in a specific barrier configuration that each receive a tube or tubes fitted therein that are filled with water, forming a self supporting structure. Which structures provide a barrier or a shape to perform a certain design function or functions, such as a dam that is lower at its center to direct a flow thereover, a fish ladder type arrangement, a reinforced dam structure where the sleeves are connected side by side to contain several different diameters of water filled tubes. The sleeves and their connections of the invention can further include accessories: such as an anchor or leakage prevention sheet or cloth; can be arranged with a culvert for fitting under the dam to reduce leakage; can receive metal posts or tubes fitted through an opening or openings formed through the sleeves, at their connection, can include anchor points and loops sewn in to the sleeve or sleeves to receive hard tube pipe as attachment points, as well as tie-offs for providing additional support, and incorporate spaces between the sleeves for driving posts therethrough into the ground as dam anchors; and can be formed as a fish ladder, overflow dam or the like, providing a number of useful water filled dam arrangements that are unique to the invention.

BRIEF SUMMARY OF THE INVENTION

It is therefore a principal object of the present invention to provide a hydraulic structure that is formed from a section or sections of water filled sleeves, envelopes, or the like, that are joined together in side by side, end-to-end, or stacked on top of one another, or in other configurations, with the sleeves receiving individual tubes that are filled with water, for forming dams, overflow dams, breakwaters, piers, bridging structures, docks, platforms for drilling, and the like, where such formed structure will be stable when subjected to wave action, a transverse hydraulic force or forces as would tend to permanently move the structure.

Another object of the present invention is to provide a plurality of sleeves, each formed from a strong puncture resistant material, that are joined together as by sewing, clamping, welding or like fastening, along common edges with the sleeves to each receive a tube or tubes that are filled with water to expand against the sleeve walls and are closed within the sleeves to form a water barrier having a desired shape.

Another object of the present invention is to provide a plurality of sleeves, that can be alike or of different sizes and configurations that are for joining together so as to contain an individual water filled tube or tubes, which sleeves are preferably open ended, but can include ends that can be individually closed over or are shaped with a ring structure to pass an individual water filled tube end therethrough for closure as with a tie, and with one such sleeve end closured provided by sewing of a zipper across a sleeve end or ends.

Another object of the present invention is to provide for maintaining a tube or tubes longitudinally in each sleeve such that a plurality of tubes are arranged in side by side relationship and, as required, at least one of the tubes can include a center longitudinal divider for providing a roll resistant structure Another object of the present invention is to provide a water filled structure formed from a plurality of sleeves arranged side by side where the sleeves are joined along contacting longitudinal surfaces, with some or all of the sleeves formed to have unlike, with a section of a lesser diameter sleeve to serve as a spillway.

Another object of the present invention is to provide, with the water structure, an anchor sheet or sheets that is or are secured across one or a plurality of the sleeves, with the weight of the column of water above the anchor cloth to hold the water structure in place.

Still another object of the present invention is to provide sleeves of different diameters for joining along common longitudinal surfaces that each contain a water filled tube or tubes for forming a water structure for a particular function.

Still another object of the present invention is to include, at least a pair of sleeves that are connected longitudinally, with each of which sleeves to maintain at least one water filled tube fitted therein, and where, prior to filling of the tube or tubes with water, the pair of connected sleeves is positioned over a transverse culvert, or like structure, allowing a flow through the culvert that travels beneath the water structure.

Still another object of the present invention is to provide a water filled structure where a junction between connected sleeves includes an opening that a pole, stanchion, pipe, post, or the like, can be fitted through and driven into the ground for anchoring the structure.

Still another object of the present invention is to provide, with the pair of joined sleeves, a pair of load strips that are fitted between individual sleeves and are connected, respectively, to aligned top and bottom surfaces of which joined sleeves, to hold the sleeves top and bottom surfaces in spaced relationship when transverse or side loads are directed thereagainst.

Still another object of the present invention is to provide a water filled structure that includes longitudinally connected sleeves that are each formed to provide a transverse portion of a water containment structure and, when the tubes as are contained in each sleeve are filled with water, a water structure is provided that has desired design features to function as a fish ladder, spillway, overflow, or the like.

The present invention is in the connection along common longitudinal surfaces of at least a pair of sleeves that are each formed to contain and maintain a at least one flexible water filled tube, providing a water structure that will resist being rolled when subjected to a side or transverse hydraulic load directed against one face of the water structure. The respective sleeves can be formed to have the same or different diameters and lengths, are preferably formed from a stiff section of material, that will or can be coated to resist punctures, and can be formed into a sleeve or sleeves as by sewing, utilizing at least one and, preferably, a plurality of seams to stitch the section or sections of material together. At least two, or more, sleeves are connected along common longitudinal surfaces, and that connection or joint can be reinforced, as required, with a strap sewn along one or both of the joint surfaces, or can be a mechanical reinforcement, such as sandwiching and maintaining together, as by clamping and/or bolting the joint together, between opposing gusset plates.

At least two sleeves are included with the invention, with each sleeve for containing and maintaining at least one water filed tube. It should, however, be understood that the invention can be in more than two sleeves that can be of different diameters and shapes, and are joined in side by side or end to end relationship to form a multitude of shapes of water structures. With each shape as is formed to perform a function or functions for a particular problem the water structure is intended to handle or solve. With such sleeve arrangements to include, but are not limited to: a side by side relationship of sleeves of successively lesser diameter, forming a right triangle shape; a sleeve or sleeves having a lesser diameter portion or section as a spillway to pass and direct a volume of water as is maintained behind the sleeve ; a side by side sleeves of a greater to lesser diameter, forming a fish ladder type structure maintained between ends of separate water structures to both function as a dam, and/or overflow dam, and to accommodate fish swimming up stream to spawn; and with different diameters of sleeves for coupling together in side by side relationship to accommodate different sizes of tubes for filling with water and even tubes containing center dividers.

Where the invention provides for sleeve end closures, such can be zippers, or the like, that are installed in the sleeve end or ends for containing a water filled tube whose end has been closed. Also, the connected sleeves can be laid over a transverse culvert, or like tube for structure; can include a slot or other opening in an outer containing sleeve that aligns with a junction or junctions of contained inner sleeves to receive an anchor pole, tube, or the like, fitted therethrough and driven into the ground as an anchoring post or pipe arrangement, and may include an anchor sheet or sheets that are each individually secured to extend outwardly from along a sleeve surface to be anchored on the bottom of a volume of water that is retained by the water structure, with the weight of water on the anchor sheet to hold the water structure in place.

In practice a flexible polyethylene plastic or vinyl welded tube manufactured by Layfield Plastics, having a range of wall thickness of from ten (10) to twenty (20) millimeters has been used successfully for installation in the stiff fabric sleeve or sleeves of the invention. Though, it should be understood, the invention is not limited to any particular sleeve or tube manufacture or thickness; can utilize sleeves and/or tubes of greater or lesser wall thickness; can include a mat, of metal, fiber, glass or like secured between the joined sleeves at their top and/or bottom surfaces to provide additional structure for holding the sleeves together, and can be attached to an anchor pipe, or the like, within the scope of this disclosure.

DESCRIPTION OF THE DRAWINGS

In the drawings which illustrate that which is presently regarded as the best mode for carrying out the invention:

FIG. 2A is a view like that of FIG. 1B only showing the single sleeve as having be sewn longitudinally at spaced apart axis to form one large and two smaller sleeves;

FIG. 2B shows the sleeve of FIG. 2A that has been formed into three individual sleeves that have received flexible tubes fitted therein that have been filled with water and their ends closes, forming a water structure;

FIG. 2C shows an end elevation view of one of the sleeves of FIG. 2B that includes a zipper secured, as by sewing across a sleeve end, for closing a water filled tube contained therein;

FIG. 2D shows an end elevation view of the end of the sleeve adjacent to the largest sleeve as including a collar formed in the sleeve end that is reinforced and with the water filled tube end pulled therethrough and tied off, or folded upon itself, closing the tube end;

FIG. 3A shows an end elevation view like that of FIG. 1A only showing two separate sleeves with their longitudinal edges shown overlapped and sewn together;

FIG. 3B shows an end elevation view of the sleeves of FIG. 3A that have been joined together by sewing along common longitudinal surfaces and further includes an outer sleeve containing the joined sleeves, with the inner sleeves shown as having been fitted with tubes filled with water and the ends closed, or elevated above the top of the outer sleeve, forming a water structure;

FIG. 11A is a top plan elevation view of a water structure formed from a single sleeve that has been gathered longitudinally from a center portion to the sleeve ends and contains a pair of water filled tubes that have closed ends at the sleeve ends, showing the sleeve as having a greater diameter center;

FIG. 11B is a side elevation view of the water structure of FIG. 11 A showing the sleeve center as providing a higher center portion to function as a barrier to direct a water flow over the water structure;

FIG. 14A shows a side elevation view of first and section sleeves joined together along common longitudinal surfaces and including an anchor sheet shown coupled along a center portion to the sleeve joint;

FIG. 14B shows the sleeves of FIG. 12A that have tubes fitted therein that are filled with water, with the pair of filled sleeves shown as having different diameters and with the ground sheet extending over and beyond both the larger and smaller diameter sleeves;

DETAILED DESCRIPTION OF THE INVENTION

Heretofore temporary water structures that have been formed on site as a dam, or the like, that include plastic sleeves or tubes positioned on the ground and filled with water have been in common use as set out in the Prior Art Section. That such water structures have been fragile and subject to puncture and tearing in the physical setting where they are laid out is obvious in that they are often laid up over rocks, tree branches, or the like, and experience transverse back and forth movement across such objects due to a wave action in a body of water that the water structure dams, often puncturing or tearing a tube or tubes. Which punctures or tears and the replacement of a tube by passage of a second tube through a punctured tube is addressed in a patent application of the present inventor, Ser. No. 09/650,265 entitled "A Flexible Hydraulic Structure and System for Replacing a Damaged Portion Thereof". The present invention further addresses and solves the water structure puncture problem by a fitting of water containing tubes within an outer sleeve structure that is manufactured from a puncture resistant material and may itself be water tight to provide a desired shape and size of water structure.

Figure 1A:
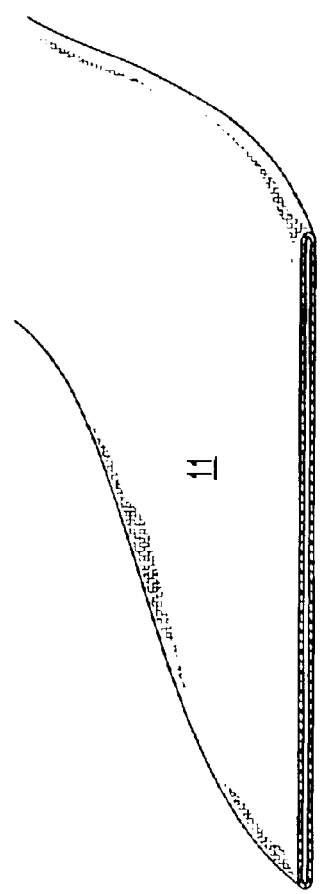
FIG. 1A is an end elevation view of a sleeve formed from a fabric material shown in a laid flat state.
Figure 1B:
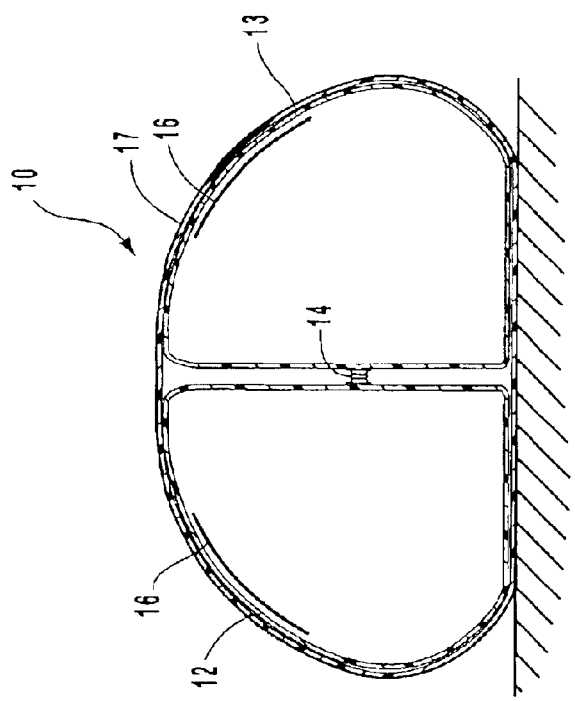
FIG. 1B is an end elevation view of the sleeve of Fig. 1A that has been sewn along its center longitudinal axis, across and through upper and lower belts, forming two like sleeves joined along common longitudinal surfaces.
Figure 1C:
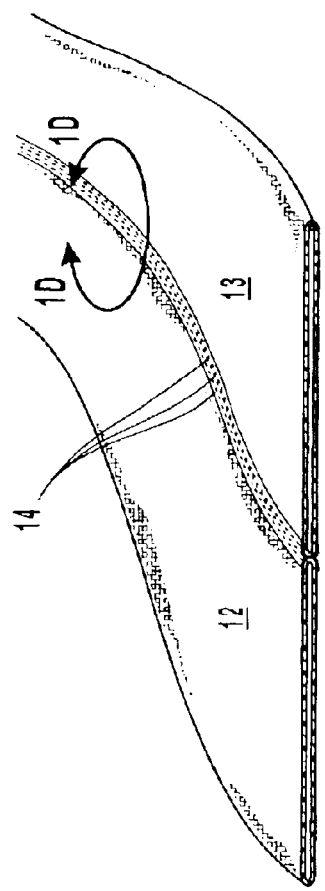
FIG. 1C is an end elevation view of the sleeve of FIG. 1B sewn to form the pair of sleeves and including tubes fitted into each sleeve that have been filled with water and the tube ends closed to retain the contained water, forming a water structure.
Figure 1D:
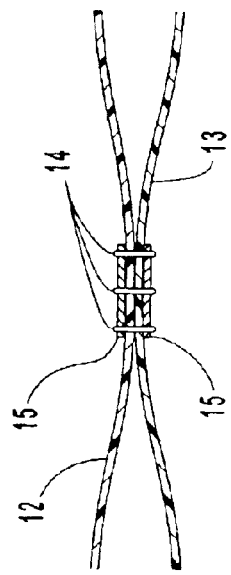
FIG. 1D is an enlarged sectional view taken within a circular section within arrows 1D—1D of FIG. 1B showing a section of the sleeve as being formed from a fabric material with belts shown fixed under and over the layers of fabric material.

The invention, it should be understood, is in a unique sleeve structure for containing water filled tubes that are either open and are maintained above the water level in the water filled tubes, or are closed at their ends, forming a water structure, such as a dam. Such sleeve construction preferably involves a sewing or otherwise securing together, such as by welding, sections of a type of strong, flexible material to form that material into a desired shape of sleeve that is puncture and tear resistant. Which material can be a section of thick plastic material such as polyethylene, but is preferably a section of a mesh material that is a weave of stripes of a plastic, or like material, having strong tensile strength that is tear resistant. A material know as woven polypropylene geotextile has been used in practice for forming the sleeves of the invention. As shown in the FIG. 1, a water structure 10 can be formed as a pair of individual sleeves 12 and 13 formed by sewing a single sleeve 11 along a center longitudinal line, forming seams 14. As shown in Figs. 1A through 1D, the pair of sleeves 12 and 13 are contained in side by side relationship, and may also be held together by an outer sleeve 17. With each sleeve 12 and 13 to receive a tube or tubes 16, shown as+ a section of a tube, that is fitted therethrough and is filled with water and has its ends tied off, or which ends are left open and the tube ends maintained above the water level in which tube or tubes, forming water structure 10. The sewn seams 14 are preferably triple longitudinal stitches that utilize a thread that is very strong in tension, such as a Kevlar thread, and may be reinforced by addition, as shown in FIG. 1D, by an inclusion of top and bottom section of a a belting material 15, such as a conventional automobile seat belt. Which seat belt is preferably sewn onto upper and lower surfaces of the sleeves 12 and 13, with the seams 14 sewn therethrough, sandwiching the sleeve 11 between the sections of belt 15. With the belt or belts 15 optionally include, within the scope of this disclosure, loops formed or fitted thereto that are for use with anchor ropes, or the like, for securing items to the belt and sleeves.

A water structure 20, that is similar to water structure 10 shown in FIG. 2B, and is also formed from a single sleeve 21, that is sewn at stitching 22 along a sleeve 21 longitudinally center line, forming sleeve section 26. The single sleeve 21 is also shown sewn along the center of a right side section of the sleeve 21 from the stitching 22 the section longitudinal center along stitching 23, forming a pair of sleeve sections 24 and 25 that have a lesser diameter as compared to the diameter of sleeve section 26, as shown best in FIG. 2B. The water structure 20 sleeve sections 24, 25 and 26, are shown contained within an outer sleeve 28 that is formed of a material like that of sleeve 21, or from another strong material, within the scope of this disclosure. Each sleeve section 24, 25 and 26, receives, respectively, a tube or tubes 27, 27a or 27b, shown as sections of tubes, that are preferably of different diameters to fill the successively smaller sleeve sections, forming water structure 20. Water structure 20, as shown, to have a greater height on a forward portion and tappers downwardly to a rear portion. Like the water structure 10, the water structure 20 sleeve sections, shown in FIG. 2B joints 22 and 23, respectively, are shown as sewn. It should however be understood that, like the water structure 10, the sewn joints of water structure 20 can be reinforced, as with a belt or belts, within the scope of this disclosure.

FIG. 2C shows a view of the end of the sleeve section 26 of FIG. 2B as having been fitted with a zipper 29 that, when closed, will contain the water filled tubes 27, 27a and 27b that have been closed at their ends or are folded upon themselves. Or, alternatively, a single tube can be folded upon itself as used as a pair of tubes for fitting in a single sleeve. FIG. 2D shown the end of the sleeve section 24 of FIG. 2B as having been formed into a collar 29a that an end 27d of the water filled tube 27b has been pulled through and closed, as, for example, with a tie 27e. Or, alternatively, the tube 27b end can be maintained above the level of water contained in which tube and left open. A zipper and collar like the zipper 29 and collar 29a shown in FIGS. 11A and 11B can be used with the water structure 20 sleeve sections 24, 25 and 26 of FIG. 2B and as end closure arrangement for use in any of the water structures as set out herein. It should be further understood, that the invention is not limited to the zipper and collar closures 29 and 29a only and can incorporate other appropriate sleeve end closures.

FIG. 3A shows a pair of individual sleeves 31 and 32 with an edge 32a of sleeve 32 positioned over an edge 31a of sleeve 31 and the edges sewn together by stitching 33a and 33b. Shown in FIG. 3B the coupled sleeves 31 and 32 could be fitted in side by side relationship into an outer sleeve 36 and each sleeve 31 and 32 receives a tube 34 or tubes, not shown, fitted longitudinally therein and filled with water, forming water structure 30 that is like the water structure 10 of FIG. 1C. Like water structure 10, the junction of sleeves 31 and 32 can include a belt or belting as a reinforcement of the stitched junction, that can itself include loops or the like, not shown for attaching items or for receiving tethering ropes for holding the sleeve to something, within the scope of this disclosure.

Figure 4:
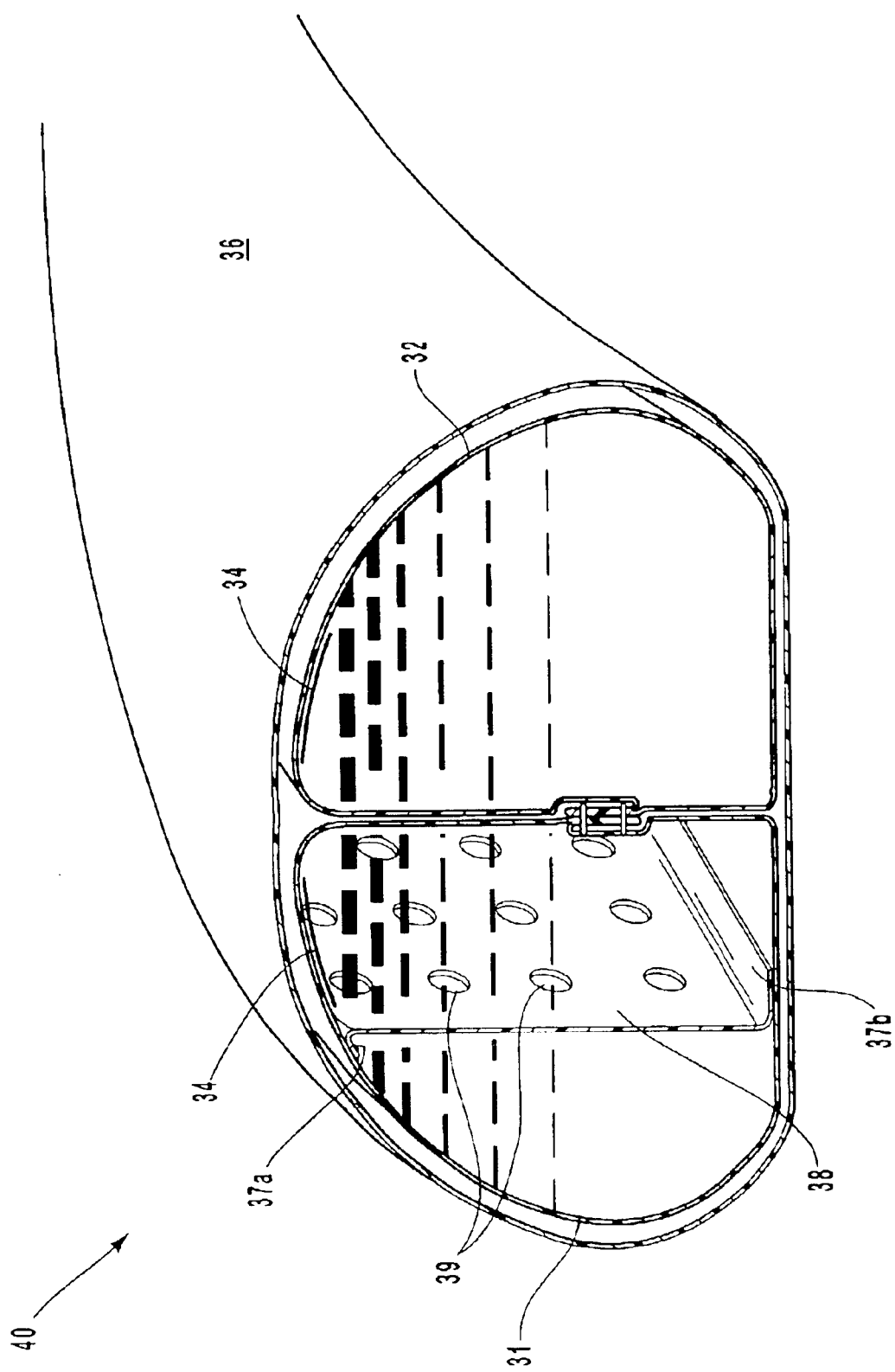
FIG. 4 is a view like that of FIG. 3B only showing one of the pair of water filled tubes that have each been fitted into each of the joined sleeves, with one water filled tube shown as including a divider wall that extends the length of the tube and divides it into two sections, and which divider wall is shown as including a plurality of spaced holes formed therethrough.

FIG. 4 shows a water structure 40 that is like the water structures 10 and 30, as described above, and includes the individual sleeves 31 and 32 that are maintained in outer sleeve 36, with each including a water filled tube 34, respectively, and with that tube 34 shown as including a center dividing wall that is connected along its edges 37a and 37b to opposite surfaces of the tube inner surface, forming the vertical dividing wall 38 that includes spaced openings 39 that allow a limited liquid flow across the dividing wall.

The water structures 10, 20, 30 and 40, as set out and described above, represent structures that will, when erected, hold back a body of water. Where, in holding back a body of water, when a wind passes over such body of water to cause a wave action, the structure allows excess water held by the darn to pass over the top of the structure, functioning as an overflow dam. Further, where such wave action, in practice, can result in a production of transverse forces that are direct into the water structures 10, 20, 30 and 40, and the other water structures of the invention, by a connection together of sleeves that maintain water filled tubes, such wave action is prohibited from rolling or otherwise displacing the water structure. In addition to the longitudinal coupling of the individual sleeves, as shown, the water structures 10, 20, 30 and 40 may also include an outer sleeve that contains the longitudinally connected sleeves, discouraging lateral movement. To add additionally stability, water structure 20 is shown as including the three separated sleeve sections contained in an outer sleeve, and water structure 40 includes, within at least one of the sleeve sections, a dividing wall that is formed with spaced holes that limit water surges as could be passed into the water structure 40 from wave action in the body of water that the water structure 40 contains.

Figure 5:
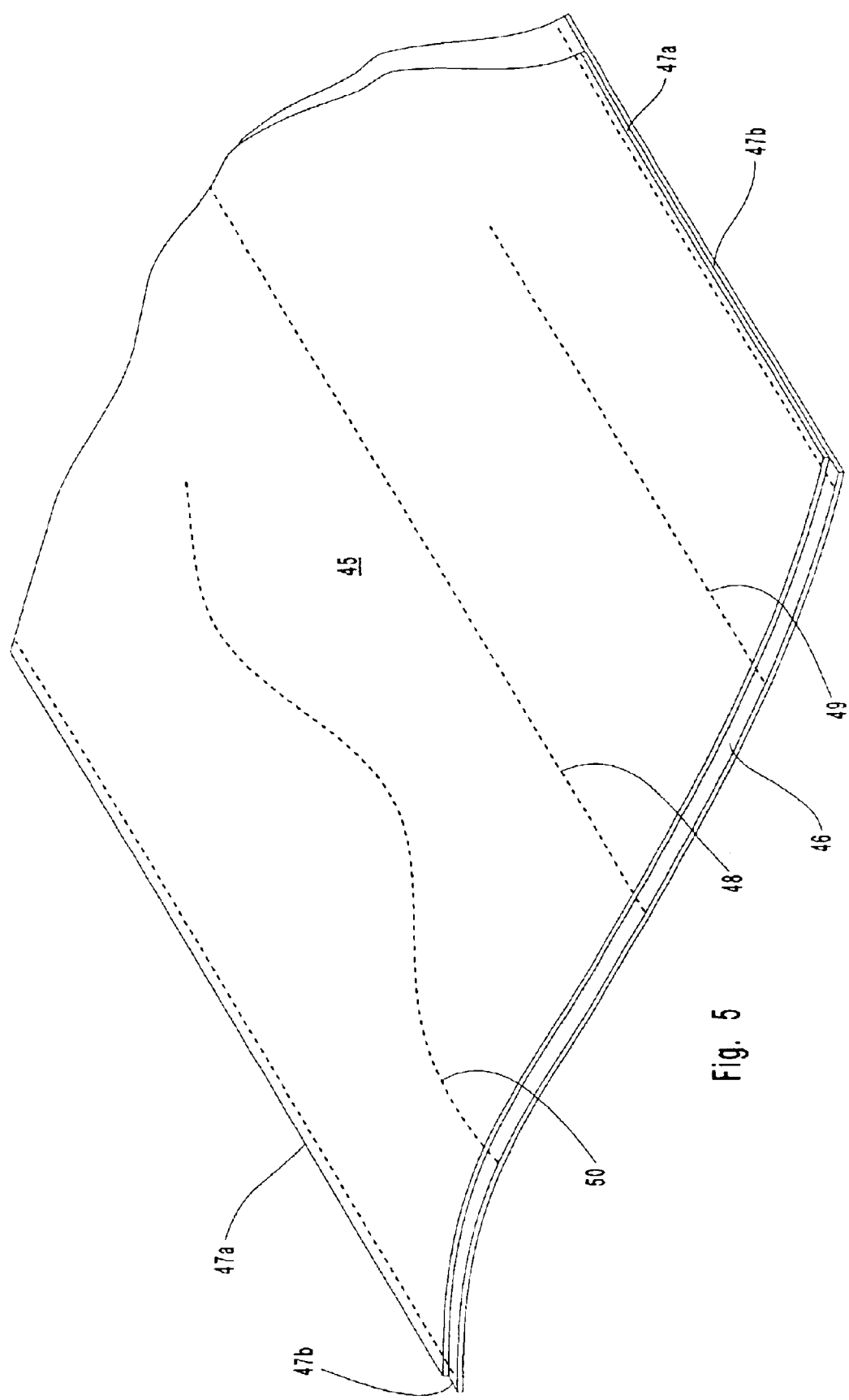
FIG. 5 is an end elevation perspective view of a pair of top and bottom sheets of a sleeve fabric material that are shown longitudinally sewn together along their outer edges, are sewn together along a longitudinal center line forming right and left sections that are themselves shown sewn along, respectively, a center line dividing the right section in two with the left section sown as sewn along a sinusoidal curved line, forming four individual sleeve sections.
Figure 5A:
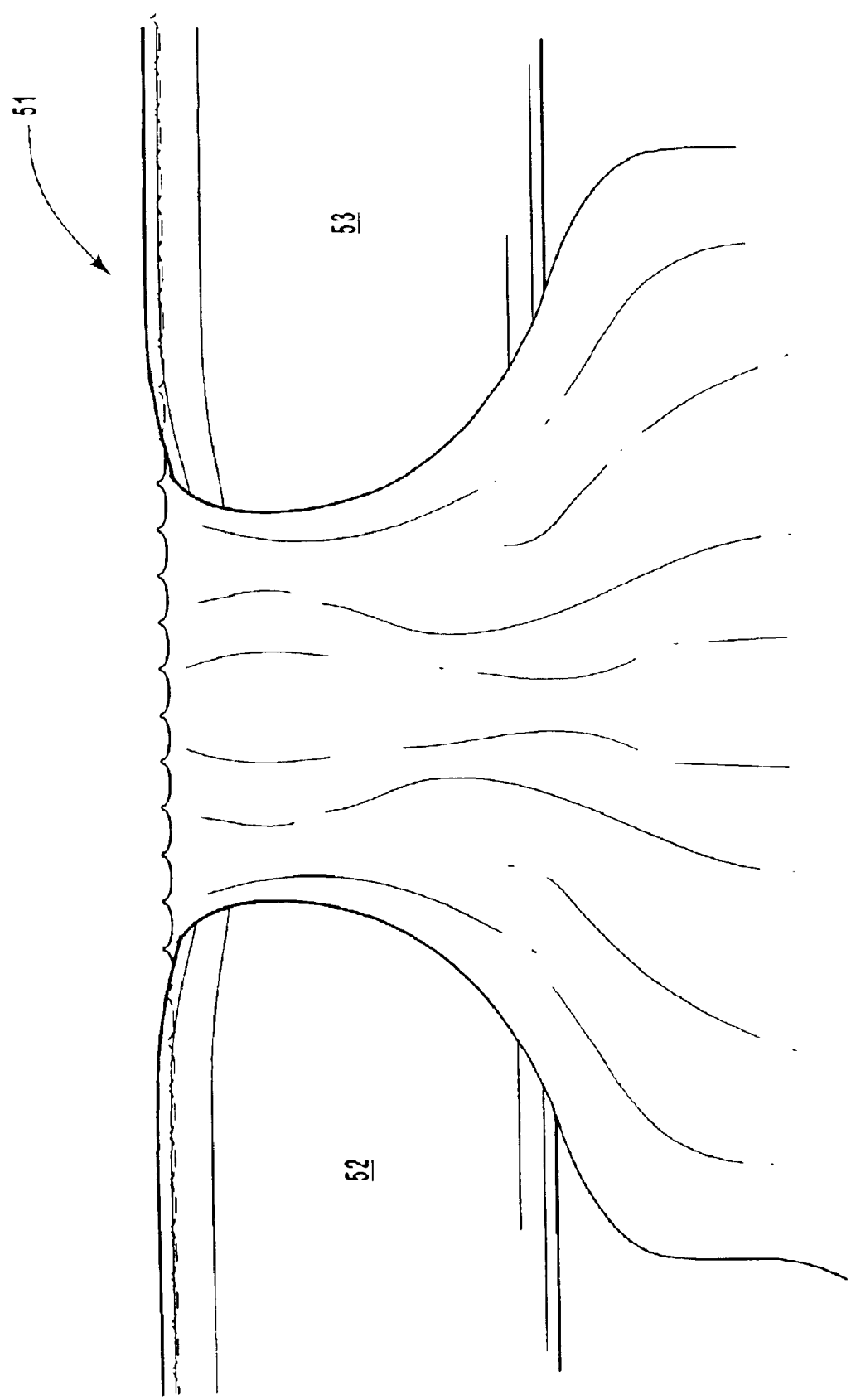
FIG. 5A is a frontal view of the four individual sleeve sections formed as shown in FIG. 5 that have each been fitted with a tube that has been filled with water forming a water structure having a lower height mid-section than the sections on either side thereof, that is the an outer portion of the sinusoidal curved formed in the left section, forming a spillway.

FIG. 5 shows a pair of top and bottom sections 45 and 46, respectively, of sleeve material that is shown as having been sewn together along opposite edges 47a and 47b, and along a longitudinal center line 48 forming a pair of left and right sleeves. Additionally, the right sleeve of the pair of sleeve from the longitudinal center 48 to outer edge 47b is additionally sewn longitudinally at seam 49, dividing the right sleeve longitudinally into partial sleeve sections, and the left sleeve between the center seam 48 and outer edge 47 is sewn at 50 along a sinusoidal curve. So arranged, as shown in FIG. 5A, with water filled tubes fitted and closed a water structure 51 is formed by the connected sleeves that includes the within the sleeve sections as described with respect to FIG. 5, with the seams 49 and 50 of FIG. 5, providing the water structure 51 with a lower center portion between sleeves 52 and 53, which lower center portion is the bottom of the curved seam 50, functioning as a spillway. Which water structure 51, it should be understood, can be formed as a single sleeve structure or, within the scope of this disclosure, can include an outer sleeve or sleeves arrangements, not shown, that are connected end to end with the single sleeve 45 of FIG. 5, providing a water structure, to dam a particular area, providing a spillway thereacross. Further, it should also be understood, the sleeves 52 and 53 ends can be sewn closed, can be formed with zipper ends or can include ring fitted around an opening for arrangement with the water filled tube ends contained therein.

Figure 6:
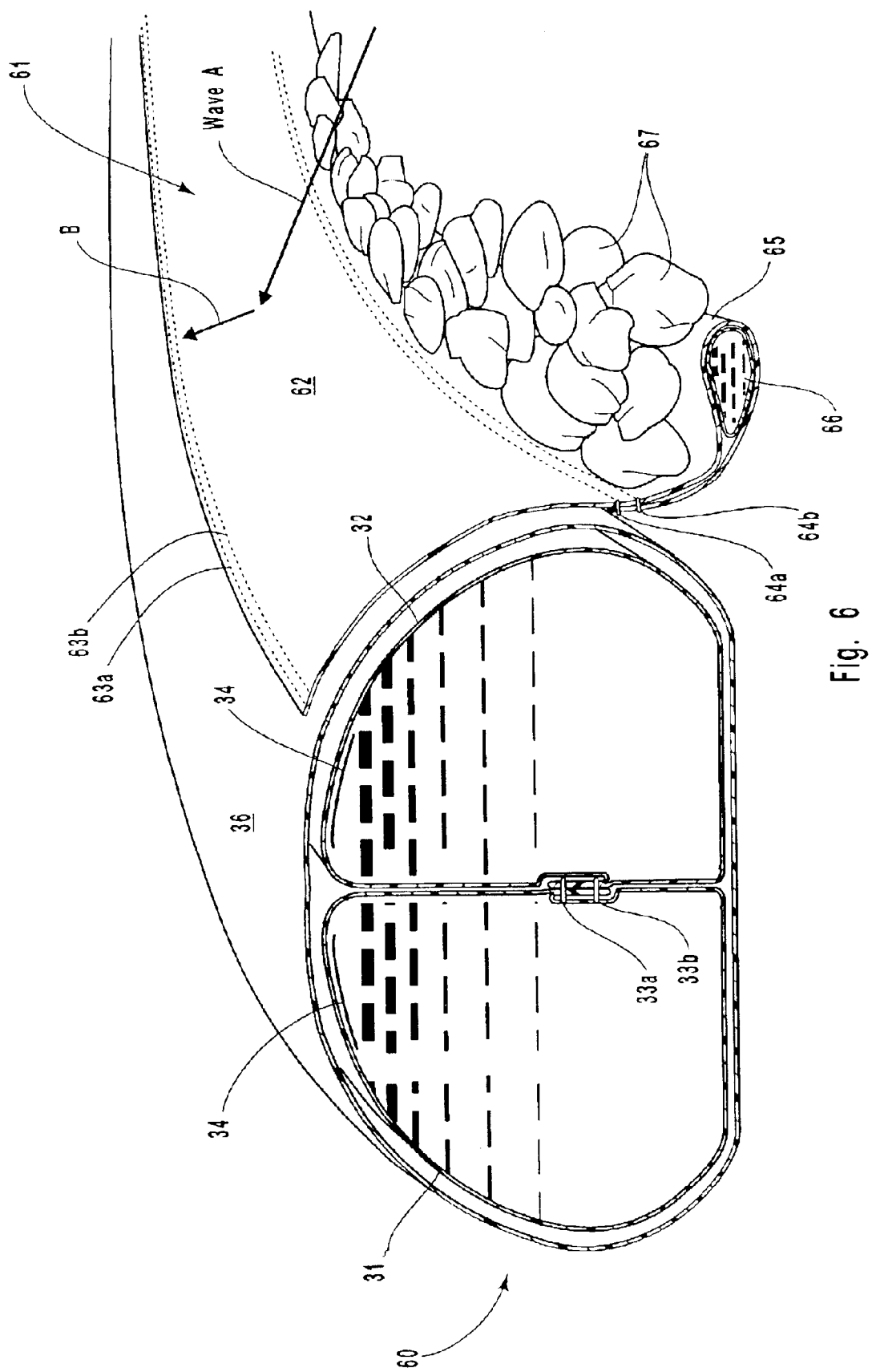
FIG. 6 is a view like that of FIG. 1C only showing the two individual inner sleeves connected along common longitudinal surfaces and are encased in an outer sleeve and showing an end of an anchor sheet fixed along a longitudinal outer surface of the outer sleeve that is shown as ending in a small sleeve that is shown pinned under rocks and sand.

FIG. 4 shows the described baffle 38 maintained within water structure 40 for dampening wave action to provide added stability to the water structure. A water structure 60 of FIG. 6 shows a wave dissipater 61 that is preferably formed from a long rectangular section of material 62 that is sewn longitudinally along stitches 63a and 63b to an upper or top portion of the outer sleeve 36 of the water structure 40 shown in FIG. 3B and extends the length thereof. As shown with the water structure 30 of FIG. 3B, the water structure 60 preferably includes separate sleeves 31 and 32 that are joined along overlaid longitudinally surfaces as by sewing along seams 33a and 33b and are contained within an outer sleeve 36. Each sleeve 31 and 32 contains a water filled tube 34, respectively, with the wave dissipater 61 shown included to dissipate waves as are induced into the water structure 60.

FIG. 6 further shown an anchor material 62 that is attached to outer sleeve 36 ahead of a volume of water maintained by the water structure 60 for wave redirection, with a wave, shown as arrow shown striking the section of anchor material 62 and being redirected upwardly, shown as arrow B, dissipating wave energy and, if the wave is sufficiently strong, allowing excess water to spill over the wave structure 60 top. The slope of the wave dissipater 61 to the seams 63a and 63b is determined by a positioning of an anchor sleeve 65 on the ground where, as it is shown in FIG. 6, it is held in place by rocks and earth or sand 67 piled thereon. To form which anchor sleeve 65 the wave dissipater 61 anchor material 62 lower edge opposite to its seam connection to the outer sleeve 36, is shown folded back on itself and sewn at seams 64a and 64b, forming the anchor sleeve 65, that is shown as containing a tube 66 that is filled with water. So arranged, the section of material 62 is supported at the anchor sleeve 65 to extend at a desired angle from the seams 63a and 63b and provide an appropriate upwardly sloping surface against which wave energy is dissipated. Which a water filled tube 66 fitting into anchor sleeve 65 is shown as a preferred structure for anchoring the wave dissipater 61 edge to the ground, it should be understood that another anchor arrangement such as a chain maintained along the anchor sleeve 65 edge, not shown, or like arrangement, could be so used within the scope of this disclosure, and the anchor material 62 can be arranged to extend across the outer sleeve 36 with its edges anchored to the ground along both sides of the water structure 60.

Figure 7:
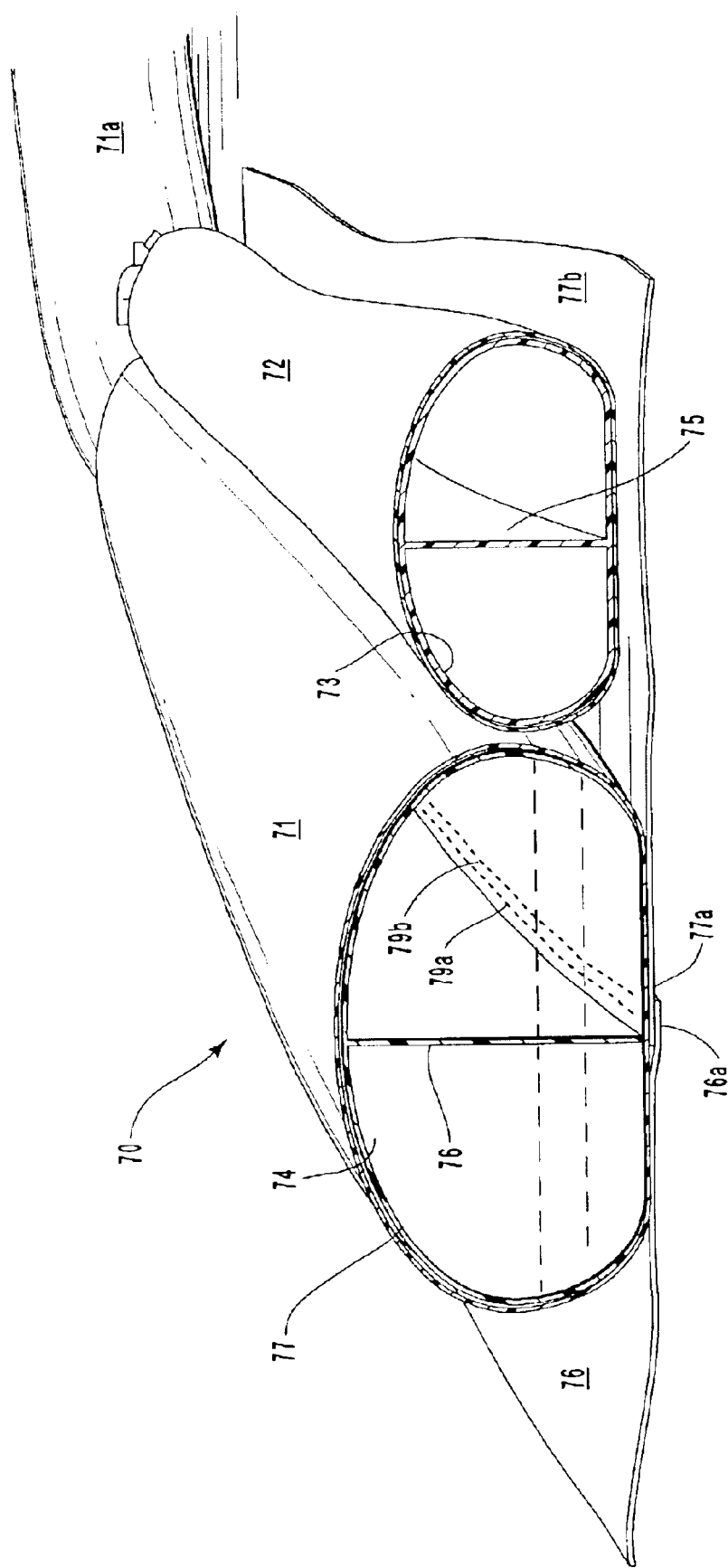
FIG. 7 is a side elevation perspective view of a pair of sleeves with the larger of the pair shown connected end to end to a like sleeve, with the pair of sleeves each shown as containing a water filled tube having a center divider and the smaller diameter sleeve is shown secured along common longitudinal surfaces to the other of the pair of sleeves, and which smaller diameter sleeve and the sleeve that it is connected to are shown positioned on a ground sheet.

FIG. 7 shows another arrangement for anchoring a water structure 70 to a ground surface to hold back a volume of water or to dissipate wave action at its forward face that includes a pair of a greater diameter first sleeve 71 and lesser diameter sleeve 72, respectively, that each contain a tube 73 and 74, respectively, that are shown as each including a center longitudinal dividing panel 75 and 76, respectively. The sleeve 71 is shown positioned over the overlapping junction of a pair of edge to edge ground sheets 77 and 78, respectively. Which ground sheets overlapping edges 77a and 78a are shown sewn at seams 79a and 79b, connecting the sleeve 71 to both ground sheets. The lesser diameter sleeve 72 is shown positioned alongside of the larger diameter sleeve 71 and connected thereto, and rests on the ground sheet 77. A second sleeve 71a containing a water filled tube is shown connected end to end with the first sleeve 71, providing a uniform height of water structure to hold back a body of water, not shown, and the lesser diameter sleeve 72 is maintained against the first sleeve 71 to reinforce the water structure 70 against movement due to weight of and from wave action in the body of water. Further, the ground sheets are shown an having a weight of water thereon as in front of the sleeve 71, and/or by a placement of rocks, sand, or the like, on the sheet 77 outer edge, for further anchoring to resist transverse movement of the water structure 70.

While single tubes 73 and 74 each having a center dividing wall 75 and 76, respectively, to divide the individual tube into two side by side compartments are shown herein, it should be understood that pairs of tubes can be fitted into each first and lesser diameter sleeves, 71 and 72, respectively, to function like the tubes 73 and 74 with dividing walls 75 and 76. Also, the lesser diameter sleeve 72 is shown positioned alongside of, and can be connected to, the first sleeve 71, and rests on the ground sheet 77. In practice, the lesser diameter sleeve 72 can, within the scope of this disclosure, be secured, as by sewing, to the first sleeve 71 to further discourage displacement of the water structure 70.

Figure 8:
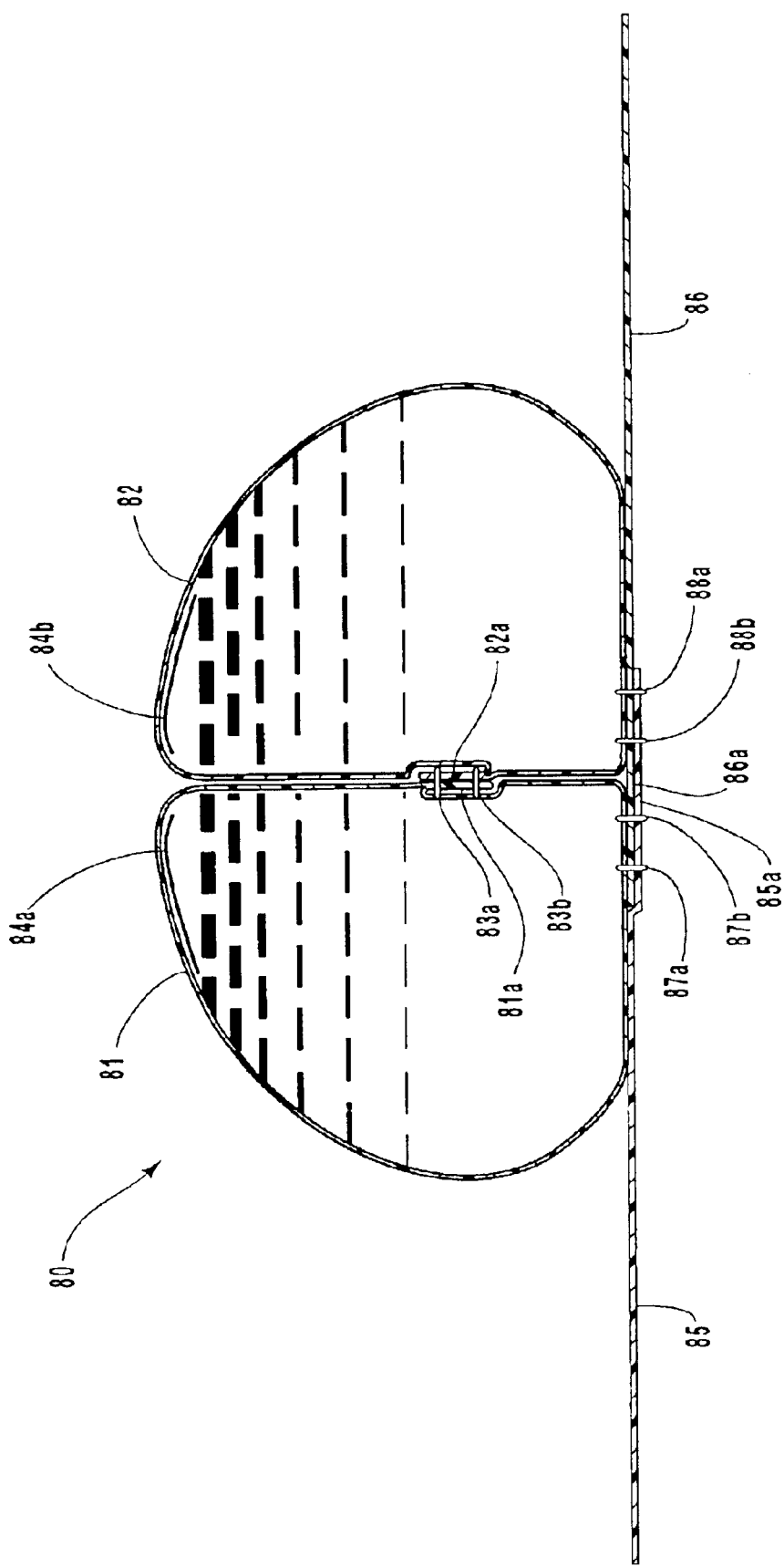
FIG. 8 is a side elevation sectional view of a pair of sleeves that are connected along common longitudinal surfaces, and contain tubes filled with water, and which sleeves are shown mounted onto a ground sheet.

FIG. 8 shows a water structure 80 that includes a pair of sleeves 81 and 82 that are coupled together as by sewing overlapping sleeve edges 81a and 82a together at seams 83a and 83b, thereby forming a water structure that is like the water structure 30 of FIGS. 3A and 3B, less the outer sleeve. For stabilizing the sleeves 81 and 82, in addition to their overlapping sewn edge connections at seams 83a and 83b, the sleeves 81 and 82 are each preferably mounted onto overlapping edges 85a and 86a, respectively, of ground sheets 85 and 86, respectively, at seams 87a and 87b and 88a and 88b, respectively. So arranged, the sleeves 81 and 82 are maintained together and each contains a tube 84a and 84b, that are shown as sections, respectively, and are filled with water. The sleeves 81 and 82 are maintained on the ground sheets 85 and 86 that are, themselves, maintained in place, as by a weight or a volume of water thereover and, as required, are further anchored in place by positioning sand, rocks or the like, not shown, thereon, for maintaining the water structure 80 in place. The water structure 80 sleeves 81 and 82 are, preferably, held together by the sewn connections 83a and 83b as well as by their mounting onto the ground sheets 85 and 86 that are, in turn, anchored to the ground by a load or loads positioned thereon.

Figure 9:
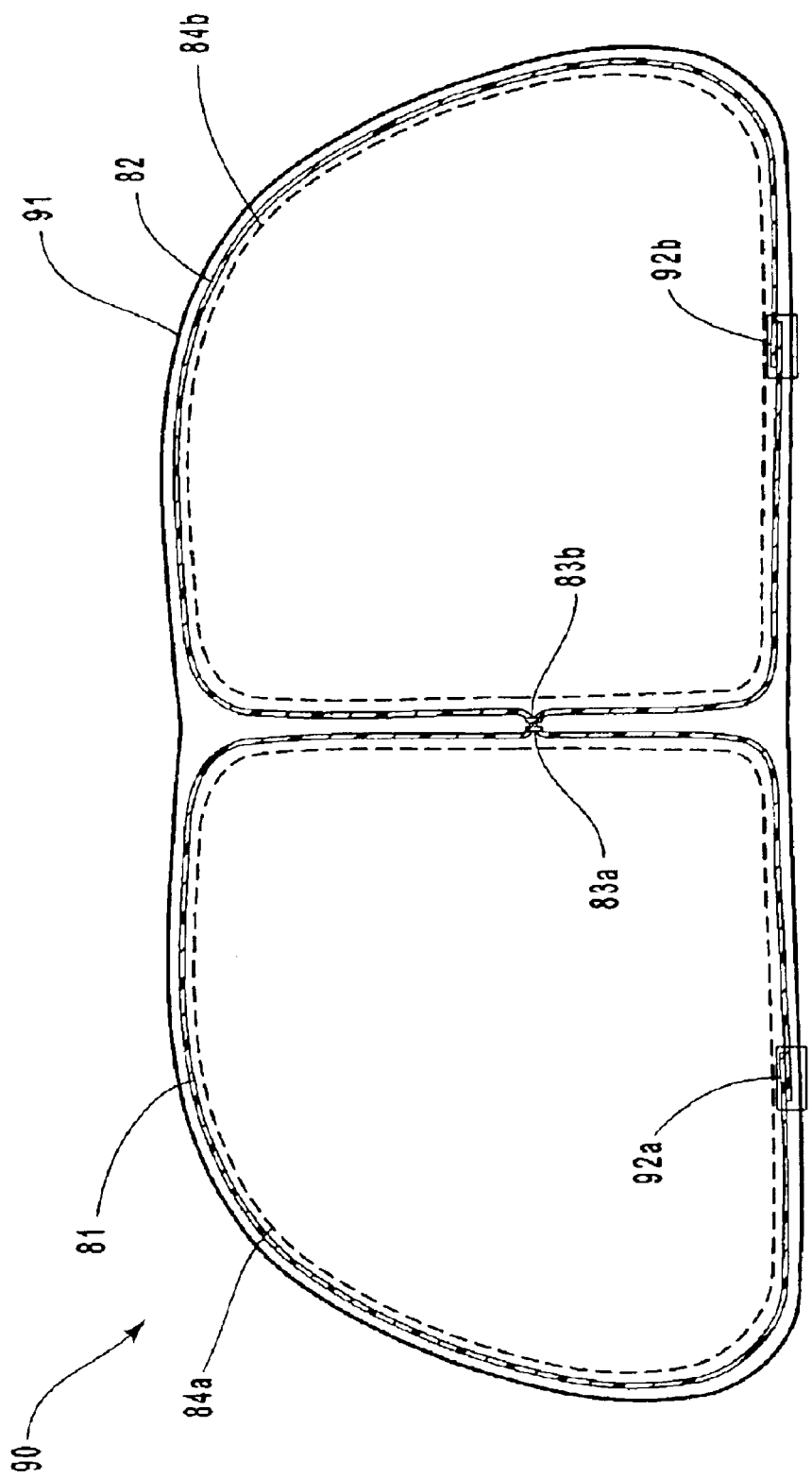
FIG. 9 is a view like that of FIG. 8 only showing the water structure of FIG. 8 as including an outer sleeve with the pair of sleeves both joined together and to the outer sleeve.

FIG. 9 shows a water structure 90 that is essentially the water structure 80, less the ground sheets 85 and 86, with transverse support provided hold the sleeves together provides by an outer sleeve 91 that is attached at joints 92a and 92b, as by sewing or like method, to the respective sleeves 81 and 82 that are shown as containing water filled tubes 84a and 84b, that are shown in broken lines, but could each include multiple tubes, not shown, within the scope of this disclosure, forming the water structure 90.

Figure 10:
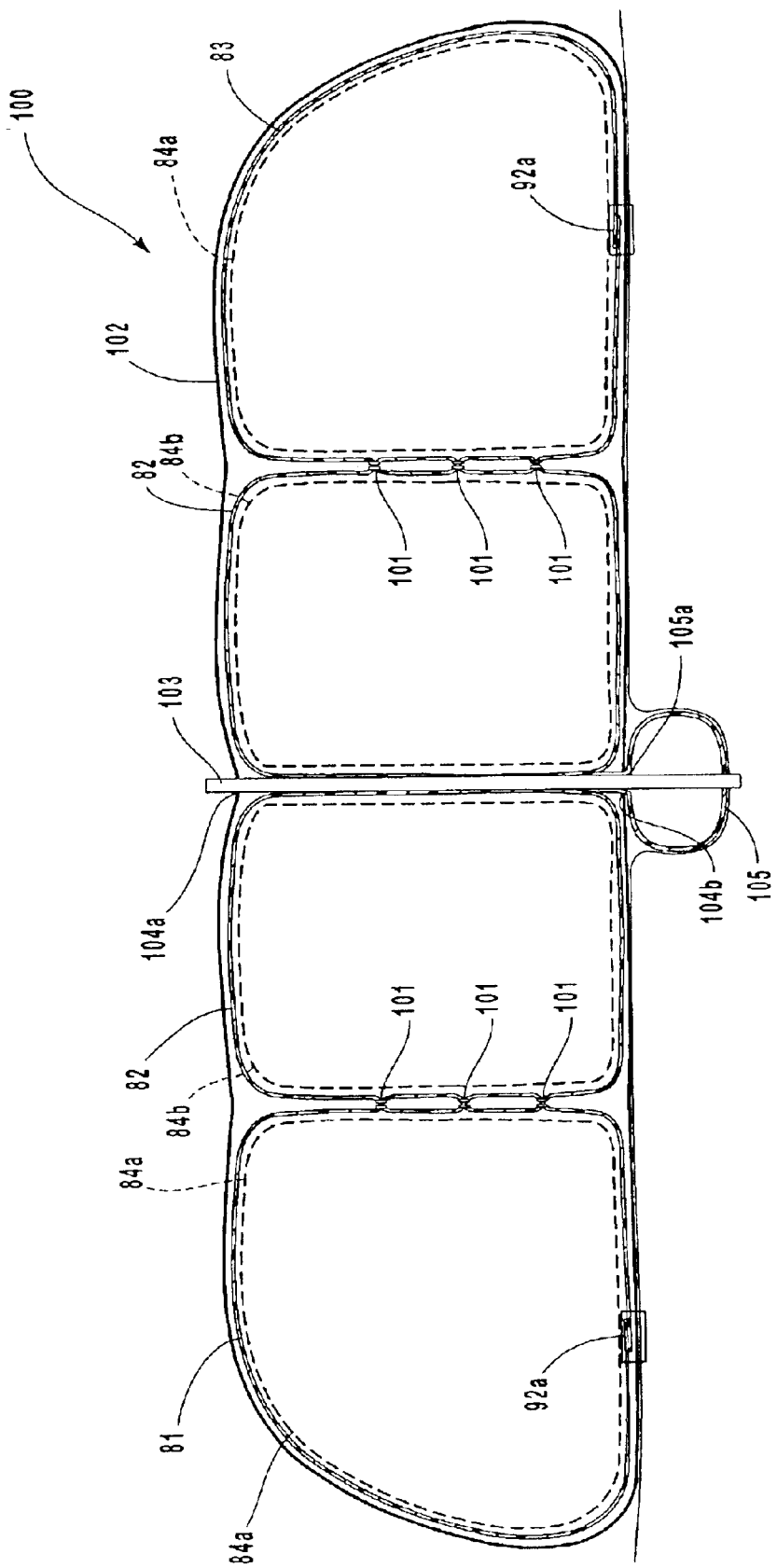
FIG. 10 is a view like that of FIGS. 8 and 9 only showing two pair of sleeves that are individually connected along common longitudinal surfaces and which pairs of sleeves are contained, in side by side relationship, within an outer sleeve and include a passage through the outer sleeve passing between the pair of sleeves wherethrough a tube or post is fitted to pass into the ground, and with a separate longitudinal seepage control tube shown maintained below the junction of the separate sleeves.

FIG. 10 shows a water structure 100 that includes two of the pairs of sleeves 81 and 82 of FIGS. 8 and 9 that are preferably also longitudinally connected, as by sewing, at seams 101, and are shown maintained in side by side relationship in an outer sleeve 102. Each sleeve 81 and 82, respectively, contains, as shown in broken lines, pairs of identical tubes 84a and 84b and 84a and 84b, respectively, that are individually filled with water. A pipe 103, for example, a straight tube, is passed through aligned openings 104a and 104b through the top and bottom of the outer sleeve 102, traveling between the pairs of connected sleeves 81 and 82 and across, but not through, a tube 105. The tube 105 is separated from pipe 103 and can be a sump for receiving liquid passed through an opening 104a in the sleeve 81 or 82 and passes between the sleeves containing tubes 84a and 84b and out of a bottom opening 104b in the bottom of the outer sleeve 102, draining through an end thereof. So arranged, the tube 105 is for seepage control for receiving water off from the top of the water structure 100 and draining it to below the water structure. Such seepage control tube 105 can be fitted to, or maintained at and opening 105a through the outer sleeve 102 below pairs of sleeves 81 and 82 junction to receive and pass seepage therefrom. Also, the pipe 103 can be driven into the ground as an anchor stake for holding the water structure 100 in place, within the scope of this disclosure.

FIGS. 11A and 11B, respectively, shown top and side elevation view of a single sleeve 106 that is shown in FIG. 11A as having straight longitudinal seams 106a and 106b formed from sleeve ends to an unseamed center section. Which seams are for gathering the sleeve material so as to provide lesser diameter end portions, with a greater diameter center portion 107. The sleeve ends are shown as having been gathered into collars 108a and 108b that have passed bunched ends 109a and 109b of a water filled tube are pulled and closed. Through, it should be understood, other sleeve arrangements could also be so used, and the tube ends 109a and 109b could be left open and maintained above the level of water therein, within the scope of this disclosure. The sleeve 106, when used as a water structure, forms, as shown in FIG. 11B, a highest section 107 that water would be divided at and flow around. In practice, a number of such gathers can be formed in a sleeve or sleeve, within the scope of this disclosure, for directing flow across a sleeve top.

Figure 12:
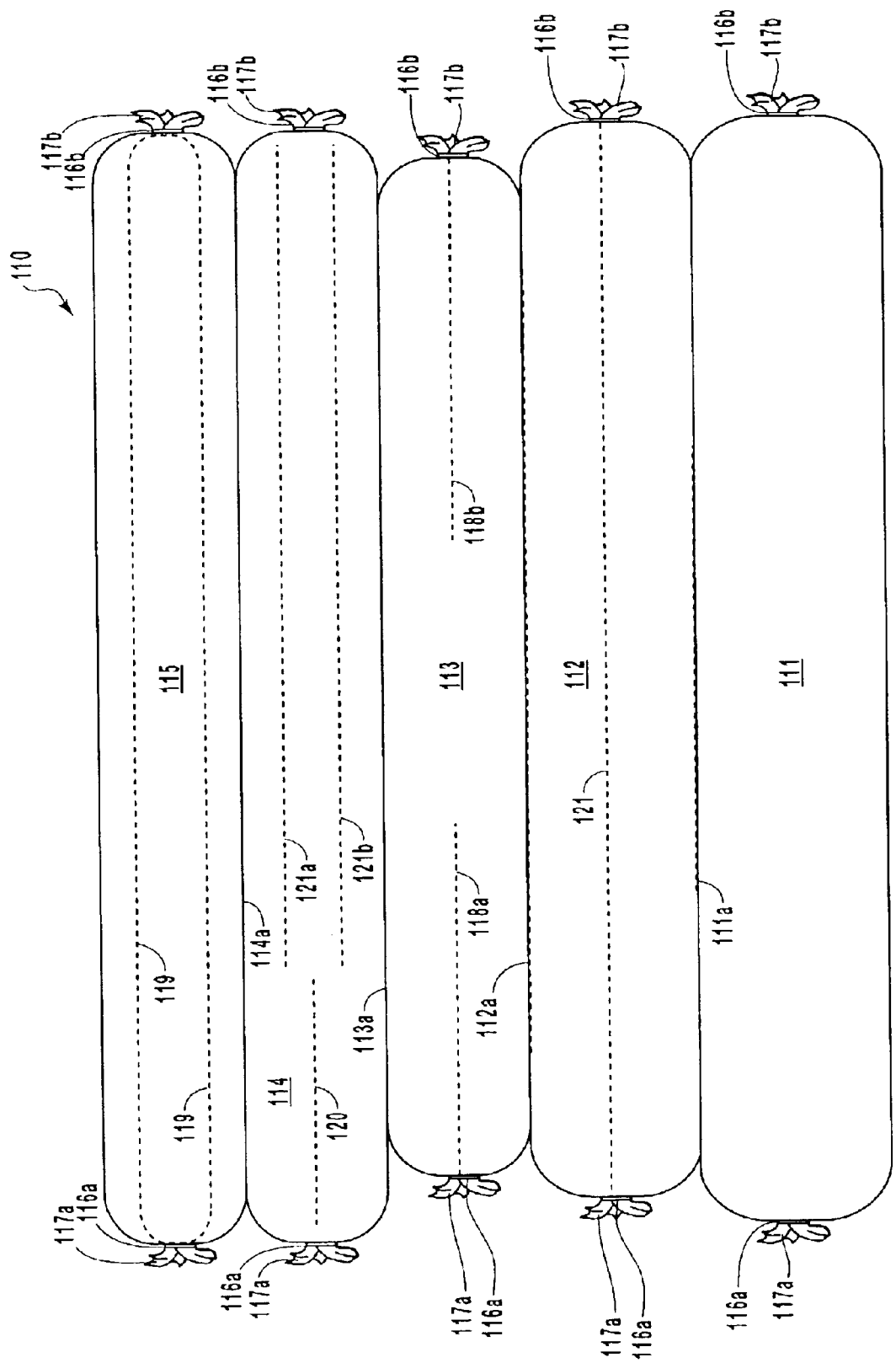
FIG. 12 is a top plan view of a number of sleeves connected to one another in side by side relationship with each sleeve containing a water filled tubes that is tied off at the individual sleeve ends, showing the sleeves gathered, as by stitching, along longitudinal portions, and which sleeves may be of the same diameter or of different diameters, forming a water structure.

FIG. 12 is a top plan view that shows a water structure 110 having individual sleeves that, like the sleeve 106 of FIGS. 11A and 11B, have successively smaller diameters. FIG. 12 shows an arrangement of parallel sleeves 111, 112, 113, 114 and 115 that are connected, respectively, along shared longitudinal surfaces at seams 111a, 112a, 113a and 114a, respectively, forming a water structure 110. Which side by side sleeves, from sleeve 111, have successively smaller diameters to smallest diameter sleeve 115, forming a stair step arrangement. As shown each sleeve end may be formed into an open ring or collar 116a and 116b, respectively, that a water filled tube end 117a and 117b, respectively, is pulled through and closed upon itself, containing a volume of water therein, or the sleeve end can be left open with an open tube end extending therebeyond and is maintained above a level or water within the tube, within the scope of this disclosure. Additional to the seams joining the respective sleeves together, sleeve 114 includes sewn seams 118a and 118b that extend, respectively from the sleeve ends to a sleeve center portion, forming, a greater diameter center portion that is like the center portion 107 of sleeve 106 of FIG. 11A and 11B. Additionally, sleeve 115 is shown as including a continuous sewn seam 119 that extends the length of the sleeve and across the sleeve ends, and with the seam sides parallel from sleeve end to end, a flattened portion or section of the sleeve is formed across its upper surface. Sleeve 114 is shown as including a sewn seam segment 120 that extends longitudinally from sleeve end with collar 116a formed therein and is equidistant from and along the sleeve longitudinal center between parallel sewn seams 121a and 121b that extend from the end of sewn seam segment 120 to the sleeve end with collar 116b formed therein. The sewn seams 120, 121a and 121b provide a sleeve having greater and lesser diameter portions with the portion of sleeve across seams 121a and 121b being a flat section. A straight seam 121 extends the length of sleeve 112 providing a flattened portion thereacross and sleeve 113 includes straight end seams 118a and 118b that reduces the sleeve cross section thereacross, leaving a center sleeve portion with a greater diameter to provide a flow path over which sleeve 113 center portion. A water structure 110 is thereby provides with a greatest height at sleeve 111 and is stepped downwardly therefrom to sleeve 115, with the sleeves 112, 113, 114 and 115 to provide flat sections or steps that are off-set from one another forming a serpentine water flow path down the water structure, for use as a fish ladder, overflow dam, or for a like purpose.

Figure 13:
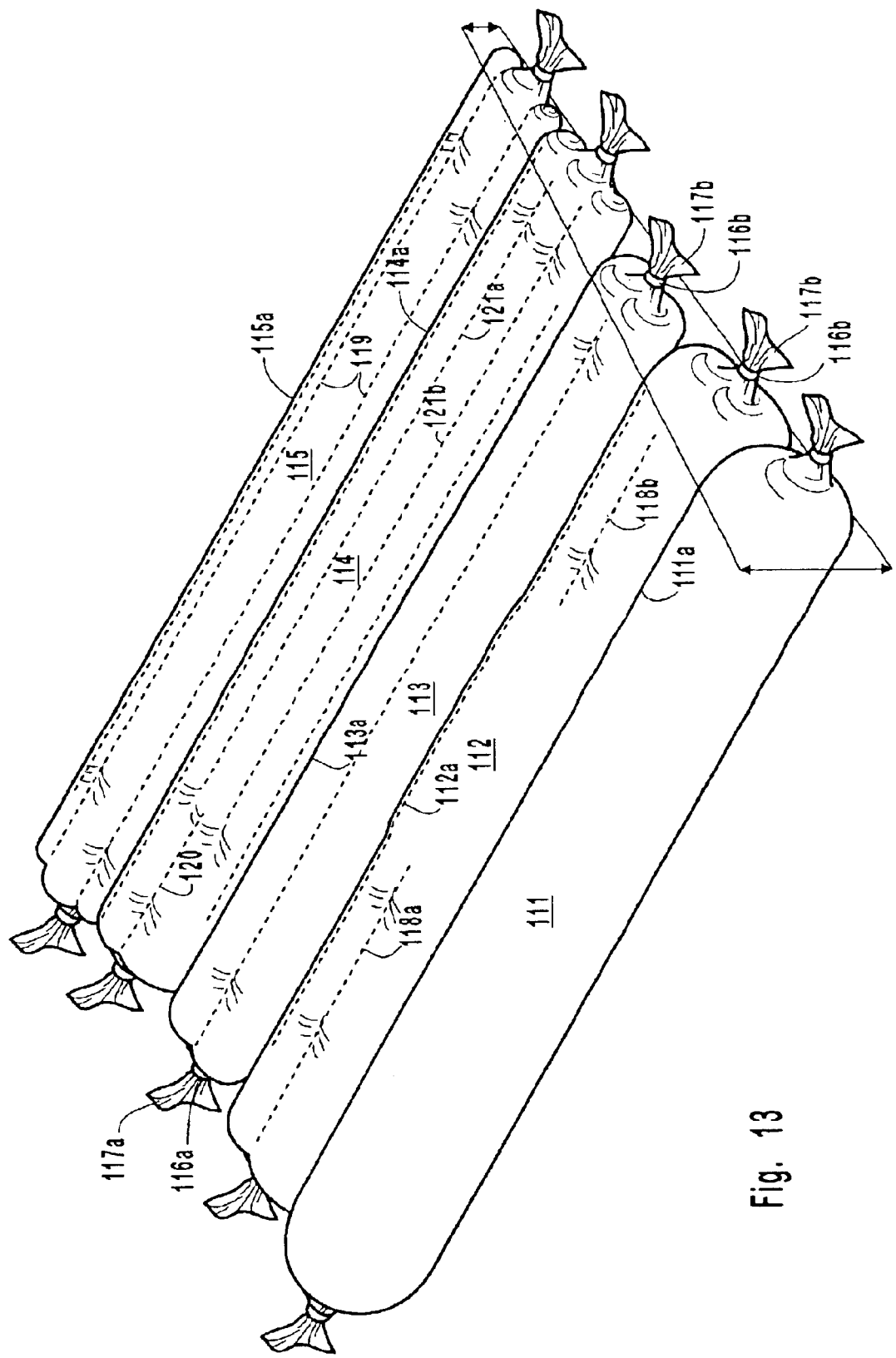
FIG. 13 is a frontal perspective view of the water structure of FIG. 12 showing sleeves that are secured together in side by side relationship having sections of different diameters to direct a water flow thereacross, as, for example, a fish ladder or flow dam.

FIG. 13 is a frontal perspective view of the water structure 110, illustrating the sloping water structure face from the greater diameter sleeve 111 to sleeve 115, and its formation into steps and with flat and raised sections providing a meandering water flow path for use, for example, as a fish ladder enabling a fish to travel up the water structure face to pass into a body of water held back by sleeve 111. Or, alternatively, the water structure 110 is suitable for use as a wave energy dissipater, as set out above.

FIG. 14A shows a formation of a greater and lesser diameter of sleeves 131 and 132, respectively, formed from a single section of sleeve material whose ends are folded back to overlay one another and are joined, as with three seams 133a, 133b and 133c. Which seams 133a, 133b and 133c, as shown also couple to top and bottom overlaying ground sheets 134 and 135 ends, respectively, that are also formed from sections of sleeve material. As shown in FIG. 14B, the formed greater and lesser diameter sleeves 131 and 132, respectively, then receiving tubes 136 and 137, respectively, shown in broken lines, that are filled with water, forming water structure 130. The water structure 130 arrangement of water filled tubes 136 and 137 in sleeves 131 and 132, respectively, can be connected to each other and to ground sheets 134 and 135 that can receive and be anchored to the ground by rocks, sand, and the like, not shown, installed on the ground sheet behind a body of water contained by the water structure 130 larger diameter sleeve 131, stabilizing the sleeves 131 and 132 in side by side relationship as they would be were they contained in an outer sleeve, as set out above.

Figure 15:
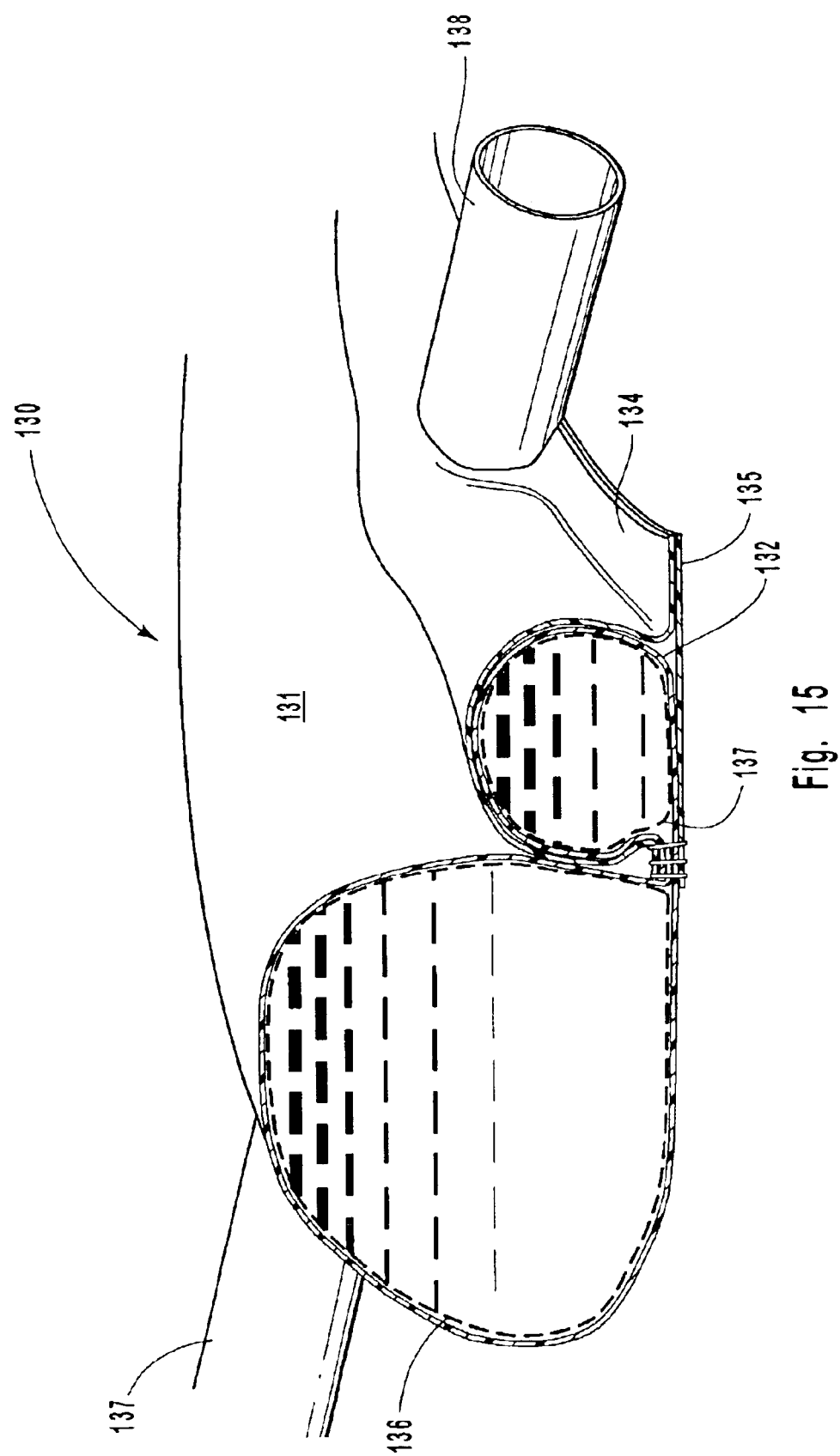
FIG. 15 shows the water structure of FIG. 14B laid over a transverse pipe or culvert.

As a use of the water structure 130, in addition to its containing a body of water, as shown in FIG. 15, prior to filling the sleeves 131 and 132 tubes 136 and 137 with water, a pipe, tube or culvert 138 can be positioned beneath and transverse to the sleeves, with the sleeves and ground sheets 134 and 135 tending to flow around and seal to the pipe, tube or culvert 138 surface discouraging leakage under the water structure 130 at the pipe, tube or culvert.

Figure 16:
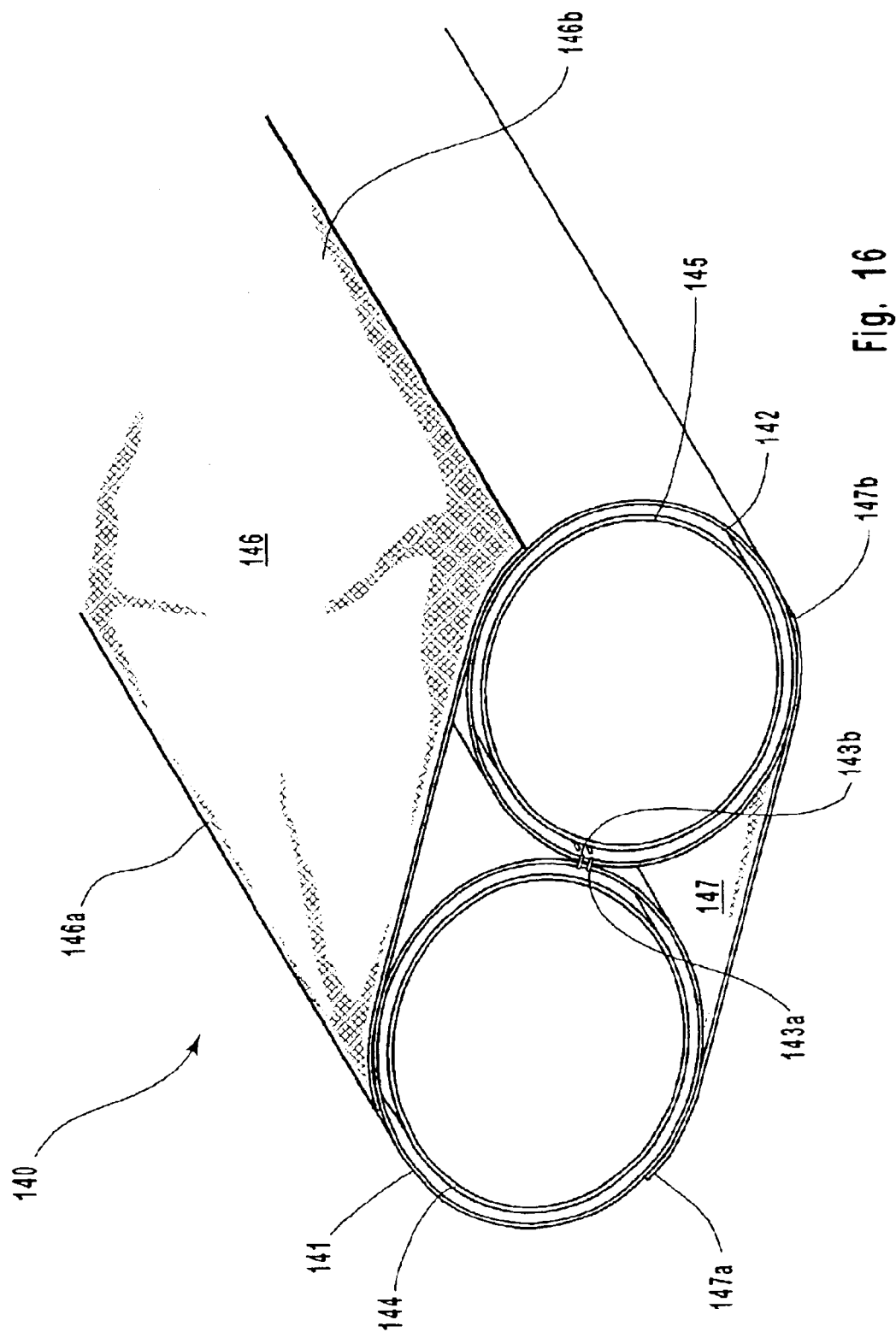
FIG. 16 shows an end perspective view of a pair of sleeves joined along common longitudinal surfaces that each contain a water filled tube, and further include top and bottom load strips that are secured at their edges to the sleeve top and bottom surfaces to extend across the top and bottom sleeve junctions.

FIG. 16 shows a water structure 140 that like the water structures 10, 30, 60, 80 and 90 includes a pair of sleeves 141 and 142 that may be joined along common longitudinal surfaces at seams 143a and 143b and, except where the sleeves 141 and 143 are themselves waterproof, contain water filled tubes 144 and 145. Unlike which water structures 10,30,60 80 and 90, however, water structure 140 does not include an outer sleeve but rather employs top and bottom load strips 146 and 147, respectively, that are each secured along opposite longitudinal edges 146a and 146b and 147a and 147b, respectively, to longitudinal sections of the respective sleeves 141 and 142. So arranged, the sleeves 141 and 142 are maintained in side by side relationship resisting movement when subjected to transverse forces such as from wave action in a body of water held by the water structure. Further, which load strips 146 and 147 can, when fixed to span the sleeves 140 and 141, respectively, to be used as a walk-way.

The invention is a use of sleeves formed of a strong, puncture resistive and durable material to, preferably, receive water inner filled tubes, or which sleeves may themselves be water proof and, when so arranged, may not require inner tubes, and which sleeves may further include an outer sleeve or sleeves, can be mounted to fixed anchor cloths, or the like, that are held onto a ground surface, or the sleeves may be connected or maintained together along common longitudinal surfaces, providing a versatile, strong and reliable water structure. Within the sleeves, the water containing tubes that are preferably used, are formed from a strong and puncture resistive material and a preferred material, as has been used in practice for a manufacture thereof, is a flexible polyethylene plastic or vinyl welded tube, or the like. An example of such preferred tube is one manufactured by Layfield Plastics, that has a range of wall thickness of ten (10) to thirty plus (30+) millimeters. Though, it should be understood, the invention is not limited to any particular sleeve material or tube manufacture or of a particular wall thickness of sleeve material or tube and that other appropriate sleeve materials or tubes can be used within the scope of this disclosure.

Although preferred embodiments of the invention have been shown and described herein, it should be understood that the present disclosure is made by way of example only and that variations are possible, within the scope of this disclosure, without departing from the subject matter coming within the scope of the following claims and reasonable equivalency thereof, which claims I regard as my invention.

I claim:

1. A water structure comprising, at least a pair of sleeves formed as tubes from a flexible material selected to resist punctures; means for maintaining said pair of sleeves, in side by side relationship, along shared longitudinal surfaces that includes a pair of flexible fabric belts that are each positioned in opposition to one another and along each shared longitudinal surface, sandwiching said shared longitudinal surface therebetween by said means for maintain said pair of sleeves; means for providing access into each said sleeve end; at least one means for containing a volume of water in each said sleeve to expand said sleeve, means for maintaining each end of each said sleeve in a closed attitude, holding a volume of water therein; and means for maintaining said pair of sleeves in side by side relationship.

2. The water structure as recited in claim 1, wherein the means for maintaining said pair of sleeves is a plurality of seams sewed through said opposing fabric belts and along common longitudinal surfaces of said pair of sleeves together.

3. The water structure as recited in claim 2, wherein the pair of sleeves are formed from two flat sections of sleeve material, and each said flat section of material is folded upon itself and joined along common edges thereof.

4. The water structure as recited in claim 1, wherein the sleeves are of different diameters.

5. The water structure as recited in claim 1, wherein the means for providing access into each sleeve end is a zipper that is sewn in at least one end of each said sleeve.

6. The water structure as recited in claim 1, wherein the means for providing access into each sleeve end is a collar sewn into at least one said sleeve end that is of a diameter to accommodate a tube end fitted therethrough.

7. The water structure as recited in claim 1, wherein the means for maintaining the pair of sleeves in a side by side relationship is an outer sleeve formed of the sleeve material and is of a diameter to fit around the pair of sleeves that each contain at least one water filled tube.

8. The water structure as recited in claim 7, wherein each of the pair of sleeves are connected to one another along shared longitudinal surfaces.

9. The water structure as recited in claim 1, wherein the means for maintaining the pair of sleeves in a side by side relationship is a flat section of a flexible ground sheet material that is positioned under the side by side pair of sleeves and is individually connected along shared longitudinal surfaces to at least one of said side by side pair of sleeves.

10. The water structure as recited in claim 1, further including forming at least one gather in one of the pair of sleeves, providing a reduction in sleeve diameter along said gather.

* * * * *